United States Patent [19]

Matsuda et al.

[11] 4,212,787
[45] Jul. 15, 1980

[54] THERMOPLASTIC ELASTOMER COMPOSITION, BLENDS OF THE COMPOSITION WITH OLEFIN PLASTIC, AND FOAMED PRODUCTS OF THE COMPOSITION AND THE BLENDS

[75] Inventors: Akira Matsuda; Shizuo Shimizu; Shunji Abe, all of Ichihara,, Japan

[73] Assignee: Mitsui Petrochemical Industries, Ltd., Tokyo, Japan

[21] Appl. No.: 910,086

[22] Filed: May 26, 1978

[30] Foreign Application Priority Data

| May 26, 1977 | [JP] | Japan | 52-60399 |
| Jun. 1, 1977 | [JP] | Japan | 52-63353 |
| Jun. 2, 1977 | [JP] | Japan | 52-63937 |
| Jul. 8, 1977 | [JP] | Japan | 52-81026 |
| Feb. 24, 1978 | [JP] | Japan | 53-19912 |
| Mar. 14, 1978 | [JP] | Japan | 53-28201 |

[51] Int. Cl.$^2$ ............................................. C08L 23/16
[52] U.S. Cl. .............................. 260/33.6 AQ; 521/134; 521/140; 525/211; 525/232; 525/240
[58] Field of Search ............ 260/897 A, 889, 33.6 AQ

[56] References Cited

U.S. PATENT DOCUMENTS

| 3,256,367 | 6/1966 | Jayne | 260/897 |
| 3,806,558 | 4/1974 | Fischer | 260/897 |
| 3,862,106 | 1/1975 | Fischer | 260/80.78 |
| 3,957,919 | 5/1976 | Von Bodungen et al. | 260/897 |
| 4,088,714 | 5/1978 | Huff | 260/897 |

FOREIGN PATENT DOCUMENTS 1010549 11/1965 United Kingdom.

*Primary Examiner*—Carman J. Seccuro

[57] ABSTRACT

Dynamically partially cured composition comprising a peroxide-curable olefin copolymer rubber (such as EDPM) and a peroxide-decomposing olefin plastic (such as PE and PP) is improved by effecting the dynamic heat-treatment with addition of a peroxide-noncurable hydrocarbon rubber (such as PIB) and/or a mineral oil softener (process oil). The dynamic heat-treatment is preferably carried out not only in the presence of an organic peroxide but also in the presence of divinyl benzene. The elastomeric composition is thermoplastic and, with or without further blending with an olefin plastic, is processable by techniques conventionally used for thermoplastic resins. This elastomer composition and blends of the elastomer composition and olefin plastic can be used for producing foamed product in combination with decomposition type foaming agent (such as azodicarbonamide).

20 Claims, No Drawings

THERMOPLASTIC ELASTOMER COMPOSITION, BLENDS OF THE COMPOSITION WITH OLEFIN PLASTIC, AND FOAMED PRODUCTS OF THE COMPOSITION AND THE BLENDS

BACKGROUND OF THE INVENTION

1. Field of the Invention

The present invention relates to a thermoplastic composition. More particularly, the invention relates to a slightly, or partially cured olefin thermoplastic elastomer composition and a method of producing the same. The elastomer composition has elasticity at room temperature, while it exhibits thermoplasticity at an elevated temperature. The composition, therefore, can be processed by methods conventionally used in the processing of thermoplastic resins.

The present invention also encompasses a thermoplastic composition obtained by blending the partially cured elastomer composition with an olefin plastic.

The invention further encompasses a method of producing a foamed product from either the partially cured elastomer composition or the thermoplastic composition obtained by blending the partially cured elastomer with an olefin plastic.

2. State of the Art

Injection molding of conventional rubber is carried out by blending additives with the rubber, kneading the blend and curing it after injection into a mold. This process entails such disadvantages as the necessity of using a special molding machine, the long cycle time involved and the need to carry out a number of complicated steps. Similar disadvantages are incurred in extrusion molding, and these disadvantages have made it impossible to carry out smooth mass production of rubber products. Thus, it has been suggested that rubber might be replaced with materials which can be processed without curing but which have properties similar to those of rubber.

This suggestion has actually been put to practice with materials having rubber-like properties. Among the materials which have been used are soft plastics such as soft vinyl chloride resin, ethylene-vinyl acetate copolymer, and low density polyethylene. Though these materials have good processability and high flexibility, they have such drawbacks as low heat-resistance and low rebound elasticity which severely limit their use.

In order to improve the heat-resistance and mechanical strength of soft plastics, it has been tried to blend them with a plastic of a high melting point such as high density polyethylene or polypropylene. This blending, however, does not result in a good product because it causes a loss of flexibility, and further, when a thick product is molded from the blended material sinkmarks are apt to occur. Recently, attention is being given to "thermoplastic elastomers", a group of materials having properties which fall between those of cured rubbers and soft plastics.

Olefinic thermoplastic elastomers are already known. For example, elastomers comprising mainly graft copolymer of polyethylene-butyl rubber or ethylene-propylene-non-conjugated diene rubber have been proposed. U.S. Pat. No. 3,806,558 discloses an olefinic thermoplastic elastomer comprising a polyolefin plastic and a partially cured rubber. Our tests show that this composition has good properties as a thermoplastic elastomer but that it has very poor fluidity compared to general purpose plastics, and therefore, when a thick or large product is injection molded, flowmarks appear on the product to such an extent that it is impossible to obtain a product of good appearance.

For the purpose of improving the fluidity of a composition comprising polyolefin plastic and partially cured rubber, one might consider:

(I) using a polyolefin plastic and/or a rubber of a low molecular weight,
(II) employing a low degree of curing, and
(III) using a higher percentage of polyolefin plastic in the blend.

The above (I) gives the composition decreased tensile properties, (II) results in low heat-resistance, tensile properties and rebound elasticity, and (III) results in decreased flexibility and gives the composition a tendency toward producing sinkmarks when it is used in molding thick products.

According to the examples described in the above mentioned United States Patent, the composition of a polyolefin plastic and a partially cured rubber disclosed therein is produced by a method comprising a first step wherein a mixture of a polyolefin plastic, a mono-olefin copolymer rubber and a curative is homogeneously kneaded at a temperature below the decomposition point of the curative, and a second step wherein the mixture is further kneaded at an elevated temperature above the decomposition point of the curative. This method involves many problems. The steps are conducted batchwise and operation temperature must be increased and decreased in the course of carrying out the steps so that a long time is required to complete the production process. The method is therefore not suitable for use in mass-production. If polypropylene is used as the polyolefin plastic, the operation temperature of the first step for homogeneous kneading should be above 165° C., because the melting point of polypropylene is around 163° C. On the other hand, the decomposition temperature of the curative, particularly if the curative used is an organic peroxide, will, at the highest, be 200° C. This permits only a narrow temperature range in which kneading can be safely performed, and therefore, there will often occur scorching, that is, undesired curing of the mixture caused by premature decomposition of the peroxide before completion of the homogeneous kneading of the ingredients. One solution of this problem that might be considered is to first knead only the polyolefin plastic and mono-olefin copolymer rubber before adding the curative at a low temperature, and subsequently, to knead the mixture at a temperature above the decomposition point of the curative to cause a slight crosslinking reaction.

This procedure, however, raises another problem. Because the amount of the curative blended in is so small as to cause only slight crosslinking, and because the curatives usually used are solid at a normal temperature, it is difficult to disperse the curative homogeneously into the above mentioned mixture of the polyolefin plastic and the mono-olefin copolymer rubber. Thus, local crosslinkings occur to produce a composition having a heterogeneously crosslinked structure. Especially in the case where the polyolefin plastic is polypropylene, a similar problem arises in connection with the dispersion of a crosslinking promotor (preferably used with a peroxide curative so as to obtain a composition of good properties) further aggravating the problem of heterogeneous crosslinking. A heterogeneously crosslinked composition is inferior to one having a homogeneously crosslinked structure in such rubbery characteristics as tensile property, heat-resistance and permanent elongation.

It has been known to improve olefin plastics in such properties as wear-resistance, tear-resistance, impact-strength, anti-stress cracking property and flexibility by blending with a rubbery material as disclosed, for example, in Japanese Patent Publication No. 6538/1959. Also, it has been known to further improve the above mentioned properties by using a cured rubber, as disclosed in Japanese Patent Publication Nos. 11240/1961, 2126/1963 and 21785/1966. In general, however, rubber has lower fluidity than olefin plastic, and the compatibility of rubber with olefin plastic is not so high. Consequently, although products produced from olefin plastic with which rubber is blended are free of sinkmarks, they are susceptible to the occurrence of flowmarks and are therefore of inferior appearance. This problem becomes more significant if the olefin plastics are blended with cured rubber.

One method practiced in producing foamed products of elastomers involves kneading natural or synthetic rubber with a curative and a foaming agent, processing the kneaded composition into a desired shape and to heat the composition to cure and foam it.

In this method, the rubber is cured before foaming takes place. Because the procedure is complicated and a special heating apparatus is necessary, and further, because the curing and foaming step takes a long time, this method has not been effectively industrialized.

In recent years, efforts have been made to replace rubber with foamed soft olefin plastics such as ethylene-vinyl acetate copolymer and low density polyethylene. However, foamed soft olefin plastics have only limited use because of two major drawbacks: they have lower heat-resistance and, because of their lower tension at melt, are susceptible to the formation of coarse cells or traces of foam collapse on the surface. For the purpose of eliminating such drawbacks, it has been proposed to cause foaming after crosslinking by irradiation with high-energy rays or by chemical crosslinking agents. Such methods require additional special steps and special devices, and therefore, are as disadvantageous from the economic point of view as the above mentioned conventional method of producing cured-foamed rubber products.

On the other hand, from, for example, the above mentioned United States Patent, it is known that a partially cured composition comprised of olefin copolymer rubber and olefin plastic can be used as a thermoplastic elastomer exhibiting properties falling midway between those of soft olefin plastic and cured rubber.

According to our experiments, such a composition has poor tension at melt and, since foam produced in the composition tends to collapse, the highest ratio of expansion of a foamed product obtained therefrom is 1.2. Furthermore, the cells are unevenly distributed and lack uniformity of size, and the surface of the product suffers from coarseness due to foam-collapse. These problems cannot easily be overcome by changing such a processing conditions as the extruding temperature and the decomposition point of foaming agents.

Also, those skilled in the art are aware of the fact that the foam-processability of olefin plastic can be improved by blending in rubber to decrease the temperature dependency of the viscosity at melt of the olefin plastic, and to improve such properties of the foam products as wear-resistance, tear-resistance, impact-strength, anti-stress cracking property and flexibility. However, in blending non-cured rubber with olefin plastics, it is necessary to use a high blend ratio of the rubber because the viscosity at melt of the non-cured rubber is substantially temperature dependent. As a result, there is a degradation of heat-resistance. On the other hand, cured rubbers have lower fluidity than olefin plastic and their compatibility with plastic is not so good. Thus, the blend of an olefin plastic and a cured rubber gives foamed products having non-uniform cell size and poor appearance.

SUMMARY OF THE INVENTION

One main object of the present invention is to provide a thermoplastic elastomer composition having excellent rubbery properties as regards heat-resistance, tensile-properties, weather-resistance, flexibility and rebound-elasticity.

Another object of the invention is to provide a thermoplastic elastomer composition which is readily processable by conventional processing techniques such as injection and extrusion molding to give large, thick products free of sinkmarks and flowmarks.

Another object of this invention is to provide a composition based on the thermoplastic elastomer composition disclosed in U.S. Pat. No. 3,806,558, which enjoys improved fluidity without substantial degradation of heat-resistance, tensile properties, flexibility or rebound-elasticity, and hence, is capable of giving products of good appearance.

Another object of this invention is to provide methods of producing the above described composition.

Another main object of the present invention is to provide thermoplastic blends comprising the above thermoplastic elastomer and an olefin plastic.

Another object of this invention is to provide a thermoplastic resin-like blend whose impact-strength, wear-resistance, tear-resistance, anti-stress cracking property, sinkmark-preventing property and flexibility are as good as those exhibited by conventional olefin plastics blended with cured rubber, and which furthermore does not give rise to flowmarks or other irregularities which might impair the appearance of products produced therefrom.

Another object of this invention is to provide a thermoplastic blend of a soft olefin plastic and the elastomer composition, which blend does not have the defects of soft olefin plastic in respect of heat-resistance and sinkmark prevention property but has improved characteristics in these respects and furthermore retains good fluidity.

Still another main object of the present invention is to provide methods of producing foamed product having fine and uniform cells, and excellent appearance free of sinkmarks and unevenness, by utilizing conventional foam-processing techniques.

Another object of this invention is to provide a method of producing foamed products which retain the desirable rubbery properties from the thermoplastic elastomer composition.

Another object of this invention is to provide a method of producing foamed products having the characteristics of plastic in addition to the rubbery properties from the blend of the thermoplastic elastomer composition and the olefin plastic.

DETAILED EXPLANATION OF THE INVENTION

The thermoplastic composition according to the present invention comprises, in general, 100 to 5 parts by weight of (A) a partially cured elastomer composition obtained by dynamic heat-treatment, in the presence of an organic peroxide, of a mixture of 100 to 40 parts by weight of (a) peroxide-curable olefin copolymer rubber, 0 to 60 parts by weight of (b) a peroxide-decomposing olefin plastic,
wherein the sum of the component (a) and the component (b) is 100 parts by weight, and
5 to 100 parts by weight of at least one member of (c) peroxide-non-curable hydrocarbon rubbery material and (d) mineral oil type softener; and
0 to 95 parts by weight of (B) an olefin plastic; wherein the sum of the component (b) and the component (B) account for not less than 5 parts by weight among 100 parts by weight of the final composition.

A basic embodiment of this invention is the above partially cured elastomer composition, which is produced by dynamic heat-treatment, in the presence of an organic peroxide, of a mixture of
(a) 90 to 40 parts by weight of a peroxide-curable olefin copolymer rubber,
(b) 10 to 60 parts by weight of a peroxide-decomposing olefin plastic, wherein the amounts of the components (a) and (b) are chosen to total 100 parts by weight, and
5 to 100 parts by weight, with respect to 100 parts by weight of components (a) and (b) combined, of (c) a peroxide-non-curable hydrocarbon rubbery material, and/or (d) mineral oil type softener.

The peroxide-curable olefin copolymer rubber of (a) is an amorphous, random elastic copolymer mainly comprising olefins, such as ethylene-propylene copolymer rubber or ethylene-propylene-non-conjugated diene rubber, which can be cured by being mixed with a peroxide and kneaded under heat to reduce or even lose fluidity. Among such rubbers, the preferable ones are ethylene-propylene copolymer rubber and ethylene-propylene-non-conjugated diene rubber, wherein "non-conjugated diene" stands for, for example, dicyclopenta-diene, 1,4-hexadiene, cyclooctadiene, methylene norbornene and ethylidene norbornene. The most preferable one is ethylene-propylene-non-conjugated diene copolymer rubber, particularly ethylene-propylene-ethylidene norbornene copolymer, because it gives a composition of excellent heat-resistance, tensile properties and rebound elasticity. Mooney viscosity $ML_{1+4}(100°\ C.)$ of the copolymer rubber is preferably 10 to 120, more preferably 40 to 80. Rubber having a Mooney viscosity of less than 10 gives products of poor tensile properties, whereas rubber having a Mooney viscosity of more than 120 give compositions of low fluidity. The iodine value of the rubber should be 16 or less. Rubbers satisfying these conditions will give partially cured compositions having balanced fluidity and elastomeric properties.

The peroxide-decomposing olefin plastic of (b) is an olefin plastic which, when mixed with a peroxide and kneaded under heat, decomposes and undergoes a reduction in molecular weight and a resulting increase in fluidity. Examples are isotactic polypropylene, copolymer of propylene and a small amount of other alpha olefin, such as propylene-ethylene copolymer, propylene-1-butene copolymer, propylene-1-hexane copolymer and propylene-4-methyl-1-pentene copolymer. Melt Index (ASTM D-1238-65-T, 230° C.) of the plastic is preferably 0.1 to 50, particularly 5 to 20.

In the present composition, the olefin plastic plays the role of improving the fluidity and heat-resistance of the composition. The amount of the olefin plastic in the composition should be 10 to 60 parts by weight, preferably 20 to 50 parts by weight to 100 parts by weight of the component (a) plus the component (b). More than 60 parts of the plastic degrades the flexibility and rebound elasticity of the composition, and further causes sinkmarks in the molded products. Less than 10 parts of the plastic results in low heat-resistance and low fluidity, and thus, makes the composition unsuitable for the proposed use.

The peroxide-non-curable hydrocarbon type rubbery material of (c) is a material which, when mixed with a peroxide and kneaded under heat, is not cured and reduced in fluidity. Examples are polyisobutylene, butyl rubber, propylene-ethylene copolymer containing 70% or more of propylene, propylene-1-butene copolymer rubber and atactic polypropylene. Among these, polyisobutylene is the best because it is both effective and easy to handle.

The term "curing" in the present specification indicates the phenomenon where, between the crosslinking reaction and the decomposition reaction which occur when the polymer is thermally reacted with a peroxide, the crosslinking reactions predominates and the apparent molecular weight of the polymer is increased. The term "decomposition" indicates the reverse phenomenon, namely that where the decomposition reaction predominates and the apparent molecular weight of the polymer is decreased.

Mooney viscosity of the hydrocarbon rubbery material of (c), is preferably 60 or less so as to improve the fluidity of the composition. This is particularly true in the case of polyisobutylene. The amount of the (c) component should be 0 to 40 parts by weight, preferably 5 to 20 parts by weight to 100 parts by weight of the above component (a) plus component (b). An amount larger than this limit degrades the heat-resistance and tensile properties of the composition and leads to, the same disadvantages as occur when the degree of crosslinking of the rubber (a) is too low.

The mineral oil type softener of (d) includes high boiling point petroleum fractions of parafinic, naphthenic or aromatic bases, usually called "process oil," as are usually used in roll processing of rubber for the purpose of facilitating the processing and at the same time promoting dispersion of carbon black or white carbon by weakening the intermolecular action of the rubber, or of reducing the hardness of cured rubber so as to increase its flexibility and elasticity. Other softeners such as paraffine, liquid paraffine, white oil, petrolatum and gilsonite may be used. The above process oil is preferable.

The amount of the mineral oil type softener blended into the composition should be 0 to 80 parts by weight, preferably 5 to 60 parts by weight, more preferably 10 to 40 parts by weight to 100 parts by weight of the above component (a) plus component (b). Too much of the softener may result in such undesirable effects as decreased heat-resistance and bleeding out of the softener and consequent degradation of the appearance of the product.

The characteristic feature of the present composition resides in that, by blending the peroxide-non-curable hydrocarbon rubbery material of (c) and/or the mineral oil type softener of (d) into the composition comprising the peroxide-curable olefin copolymer rubber of (a) and the peroxide-decomposing olefin plastic of (b) and by partially curing with peroxide, it is possible to obtain a composition superior to the composition which does not contain the above component (c) and component (d). The composition according to the present invention is conferred improved fluidity without substantial degradation of such rubbery properties as heat-resistance, tensile properties, flexibility and rebound elasticity. As a result it is possible to use the composition according to this invention to produce large and thick products which have excellent appearance and are free of sink-marks. The amount of the components (c) and/or (d) blended into the composition formed of components (a) plus (b) should be 5 to 100 parts by weight, preferably 10 to 50 parts by weight, particularly 20 to 40 parts by weight, all with respect to 100 parts by weight of (a) plus (b). Less than 5 parts of (b) and/or (c) is not sufficient to achieve any improvement in fluidity, whereas more than 100 parts will greatly degrade properties of the composition such as heat-resistance and tensile properties.

As the peroxides used for curing or decomposing rubber or plastic, the following can be mentioned: dicumyl peroxide, di-tert.-butyl peroxide, 2,5-dimethyl-2,5-di-(tert.-butyl peroxy)hexane, 2,5-dimethyl-2,5-di(tert.-butyl peroxy)hexine-3, 1,3-bis(tert.-butyl peroxy isopropyl)benzene, 1,1-bis(tert.-butyl peroxy)-3,3,5-trimethyl cyclohexane, n-butyl-4,4-bis(tert.-butyl peroxy)valelate, benzoyl peroxide, p-chlorobenzoyl peroxide, 2,4-dichlorobenzoyl peroxide, tert.-butyl perbenzoate, tert.-butyl peroxy-isopropyl carbonate, diacetyl peroxide, lauroyl peroxide and tert.-butylcumyl peroxide. Among these compounds, in view of oder and scorch-stability, 2,5-dimethyl-2,5-di(tert.-butyl peroxy)-hexane, 2,5-dimethyl-2,5-di(tert.-butyl peroxy)hexine-3, 1,3-bis(tert.-butyl peroxy isopropyl)benzene, 1,1-bis(-tert.-butyl peroxy)-3,3,5-trimethylcyclohexane and n-butyl-4,4-bis(tert.-butyl peroxy)valelate are preferable, and 1,3-bis(tert.-butyl peroxy isopropyl)benzene is the best.

The addition amount of the peroxide to the composition is chosen in the preferable range of 0.05 to 1.0% by weight, particularly based on the mixture to be heat-treated. Too small amount of addition will result in a low degree of crosslinkage in the curable rubber of (a) and degrade the rubbery properties of the composition, such as heat-resistance, tensile properties, elastic recovery and rebound elasticity, to the point of making them unsatisfactory. Too large amount of addition, that is an addition of more than 1.0% by weight, will excessively heighten the degree of crosslinkage of the curable rubber of (a) and reduce the fluidity of the composition.

Degree of partial cure should be such that gel content of the cured elastomer ranges 20 to 99%, preferably 30 to 98%, and more preferably 50 to 98% by weight.

The gel content is determined by measuring weight of non-soluble component after soaking a sample in cyclohexane at 35° C. for 44 hours.

In carrying out the above described partial curing by using an organic peroxide to produce the composition according to the present invention, it is preferable to use a peroxy-curing promotor such as sulfur, p-quinone dioxime, p,p'-dibenzoyl quinone dioxime, N-methyl-N,4-dinitrosoaniline, nitrobenzene, diphenyl guanidine, trimethylol propane-N,N'-m-phenylene dimaleimide, or a polyfunctional vinyl monomer such as divinyl benzene or triallyl cyanurate, or a polyfunctional methacrylate monomer such as ethyleneglycol dimethacrylate, diethyleneglycol dimethacrylate, polyethyleneglycol dimethacrylate, trimethylol propane trimethacrylate or allyl methacrylate. These compounds provide uniform and mild crosslinking reaction.

Addition amount of the above curing promotor or polyfunctional vinyl monomer should be 0.1 to 2% by weight, preferably 0.3 to 1% by weight, based on the mixture to be heat-treated. If a large amount of the peroxide is added, addition of more than 2% by weight will induce over crosslinking and reduce the fluidity of the composition. On the other hand, if the amount of the peroxide is added is small, the curing promoter or polyfunctional vinyl monomer will remain in the final composition as unreacted monomer and this will result in degradation of the properties of the composition due to thermal hysterisis at the time of processing the composition.

Among the above listed additives for the partial curing, divinyl benzene is the most suitable. Divinyl benzene is a liquid at a normal temperature and not only dissolves organic peroxides but also has the ability to dissolve the above components (a) through (d), and hence, as a disperser or diluent for the organic peroxide, it improves dispersion of the organic peroxide in the composition, resulting in uniform and mild crosslinking, particularly of the component (a). Divinyl benzene becomes a radical to act as a chain-transfer agent and a curative. Thus, when divinyl benzene is added, it is possible to obtain curing effects, i.e. improvement of tensile properties and heat-resistance of the composition, which are better than those obtained by use of only a peroxide. Also, the reactivity of divinyl benzene to peroxides is high so that it is not likely to remain in the produced composition in monomer form and give it an odor. If divinyl benzene is used in producing the above elastomer composition of the basic embodiment, neither (c) nor (d) of the above components is indispensable, and it is possible to obtain a good elastomer composition even if these components are not used. Use of these components gives, of course, better products.

Divinyl benzene has remarkable effects which cannot be obtained by using other additives. For example, oximes such as p-quinone dioxime often used as peroxy-curing promotor for ethylene-propylene copolymer rubber are solids, and are not capable of acting as dispersion aids for the organic peroxy compounds. For the same reason, sulfur and N,N'-phenylene bis maleimide are, despite their excellent effect as peroxide-curing promoters, not suitable for this purpose. Also, polyfunctional ethylacrylates often used for peroxide-curing of NBR have poor compatibility with the components of the present composition and contribute little to the dispersion of the organic peroxides, and therefore do little toward improving the properties of the composition. Allyl compounds such as triallyl isocyanurate have similar shortcomings. Saturated hydrocarbons, such as mineral oil type softeners, improve the dispersion of the organic peroxides but do not improve the properties of the composition, and sometimes, if used not properly, even degrade crosslinking efficiency.

Addition amount of divinyl benzene is to be chosen in the range of 0.05 to 2% by weight, preferably 0.1 to 1.5% by weight, more preferably 0.3 to 1.0% by weight based on the mixture to be heat-treated. The significance of these limits is as noted above.

The molar ratio of divinyl benzene to organic peroxide should be in the range of 1/5 to 20, preferably 1 to 5. Even if divinyl benzene is added in an amount exceeding this upper limit, no further effect toward improving dispersion of the organic peroxide is obtained, and the compound remains as an unreacted monomer which gives an odor to the heat-treated mixture and degrades the properties of the composition when processed. When added in an amount smaller than this lower limit it fails to act as a dispersion aid for the organic peroxide and as a result, decomposition of the peroxide-decomposing olefin polymer of (b) proceeds to degrade the properties of the composition. Divinyl benzene needs not be a pure product, and may be used in mixture with other hydrocarbons.

In order to accelerate decomposition of the organic peroxide, it is possible in the present method to use a tertiary amine such as triethyl amine, tributyl amine, 2,4,6-tris(dimethyl amino)phenol, or a organic metal carboxylates such as naphthenate or octanate of copper, calcium, zirconium, manganese, magnesium, lead or mercury.

In the present method, the above component materials are mixed and heat-treated, that is to say they are fused and kneaded. A conventional kneading device can be used. There may be used either an open-type device such as a mixing roll or a closed-type device such as a Bumbury mixer, an extruder, kneader or a continuous mixer. The closed-type machines are preferable, and it is advisable to carry out the kneading under inert gas atmosphere of, for example, nitrogen or carbon dioxide. The kneading can be satisfactory carried out at a temperature at which the half-life of the peroxide being used is less than 1 minute (usually 150° to 280° C., and preferably 170° to 240° C.) for 1 to 20 minutes, preferably 3 to 10 minutes.

As the procedure for mixing and kneading the components, it is recommendable to follow the following sequence: firstly to mix the peroxide-curable olefin copolymer rubber of (a), peroxide-decomposing olefin plastic of (b), peroxide-non-curable hydrocarbon rubbery material of (c) and/or mineral oil type softener of (d), and, if desired, a lubricant, and to knead these components to form a homogeneous mixture; and then, to add the curing-promoter, curing-accelerater or polyfunctional vinyl monomer and further knead the mixture under the above mentioned conditions. Weatherproofing agent, heat-stabilizer, anti-oxidant and coloring substance may be blended in during any of these steps.

The above described thermoplastic elastomer composition may be used as a blend in a wide range of blending ratio with an olefin plastic.

The (B) olefin plastic component of this embodiment of the invention includes homopolymers or copolymers of alpha-olefins such as ethylene, propylene, 1-butene, 1-pentene, 3-methyl-1-butene, 1-hexene, 3-methyl-1-pentene, 4-methyl-1-pentene and 1-octene, or a copolymer of an alpha olefin and a small amount, say 15 molar % or less, of other polymerizable monomer, for example, ethylenevinyl acetate copolymer, ethylene-ethyl acrylate copolymer, or ethylene-methyl acrylate copolymer. Melt Index (ASTM D-1238-65T, 190° C., for propylen polymers: 230° C.) of the olefin plastic should be 5 to 100, preferably 10 to 50.

The (B) olefin plastic acts to improve the fluidity of the composition of this embodiment without essentially impairing the rubbery properties of the partially cured elastomer. This is a similar role to that played by the component (b) in the component (A), and so, it is preferable to chose the amounts of the components (b) and (B) so that these components compliment one another. It should be noted, however, that the effect of the component (B) is obtainable only when it is blended with the partially cured composition prepared by heat-treatment of the mixture of the (a), (b), (c) and/or (d) components in the presence of an organic peroxide, and that this effect is not obtainable when it is blended with a composition prepared by similar treatment of a mixture of only the (a) and (b) components.

Needless to say, a blend of a major amount of the elastomer composition and a minor amount of the olefin plastic retains the characteristics of the above elastomer composition, while a blend of a minor amount of the elastomer composition and a major amount of the olefin plastic has properties of an improved plastic.

A typical embodiment of the former blend comprises:
(A) 100 parts by weight of a partially cured elastomer composition obtained by dynamic heat-treatment, in the presence of an organic peroxide, of a mixture of
  (a) 100 to 50 parts by weight of a peroxide-curable olefin copolymer rubber,
  (b) 0 to 50 parts by weight of a peroxide-decomposing olefin plastic,
  wherein the amounts of the components (a) and (b) are chosen to total 100 parts by weight, and 5 to 100 parts by weight of (c) a peroxide-non-curable hydrocarbon rubbery material and/or (d) mineral oil type softener, and
(B) 0 to 100 parts by weight of an olefin plastic.

By blending the above defined olefin plastic with a partially cured elastomer, there is obtained a composition having better fluidity than that of a partially cured elastomer which does not contain any of the above components (c) or (d), or (B), and this improvement in fluidity is attained without substantial loss of rubbery properties such as heat-resistance, tensile properties, flexibility and rebound elasticity. The blended composition can be used to mold large and thick products which are of excellent appearance and free of sinkmarks.

The proportion of the components (c) and/or (d) in the (A) elastomer composition should be 5 to 100 parts, preferably 10 to 50, and particularly 20 to 40 parts by weight, based on 100 parts by weight of the components (a) plus (b).

A typical embodiment of the thermoplastic composition according to the present invention wherein a major amount of an olefin plastic is blended comprises:
  5 to 95 parts by weight of a partially cured elastomer composition (A) obtained by dynamic heat-treatment, in the presence of an organic peroxide, of a mixture of
    90 to 50 parts by weight of (a) a peroxide-curable olefin copolymer rubber,
    10 to 50 parts by weight of (b) a peroxide-decomposing olefin plastic,
    wherein the amounts of the components (a) and (b) are chosen to total 100 parts by weight, and 5 to 50 parts by weight of (c) a peroxide-non-curable hydrocarbon rubbery material and/or (d) mineral oil type softener, and
  95 to 5 parts by weight of (B) an olefin plastic.

All the components are as defined above. Excellent products can be produced from the composition according to if, among those substances listed as examples of the olefin plastic of (B), a soft polyolefin such as a low density polyethylene, ethylene-vinyl acetate copolymer or ethylene-ethyl acrylate copolymer, is used.

The blend of this embodiment of the present invention gives molded products which are free of the sinkmarks which have been a drawback of olefin plastic products, and which have improved impact-strength and low-temperature resistance. Moreover, molded products produced with this blend do not entail the problem of having their appearance degraded by extremely low fluidity as is often observed when conventional olefin plastic/rubber (cured, non-cured or slightly cured) compositions are used. Particularly, when the blend incorporates a soft plastic, the products produced therefrom are not only free of sinkmarks but also have improve rubbery properties such as heat-resistance and permanent elongation. This is one of the advantages of this composition over a composition produced from olefin plastic and non-cured rubber.

So far as the composition of the present invention is not deprived of its fluidity and rubbery properties, it may contain fillers, e.g., calcium carbonate, calcium silacate, clay, kaoline, talc, silica, diatomaceous earth, mica powder, asbestos, alumina, barium sulfate, aluminum sulfate, calcium sulfate, basic magnesium carbonate, molybdenum disulfide, graphite, glass fiber, glass balls, shirasu-baloons, carbon fiber; and coloring substance, e.g., carbon black, titan white, zinc flower, red iron oxide, ultramarine, prussian blue, azo-pigments, nitroso-pigments, lake-pigments and phthalocyanine-pigments.

Also, it is permissible to use other various additives such as known heat-stabilizers, anti-oxidants, weather-proofing agents, anti-static agents, or lubricants such as metal soap or wax, in an amount usually used in olefin plastics and olefin copolymer rubbers.

The thermoplastic elastomer composition of (A) used in these blends is prepared in accordance with the method described earlier. Then, the peroxide-treated composition of (A) and the olefin plastic of (B) are blended. The preferable procedure for attaining uniform blending is to mix pellets of the composition (A) and pellets of the composition (B) in a V-shaped blender, tumbler blender, ribbon blender or Henshell mixer, and then, to knead the resulting mixture in an extruder, mixing roll, kneader, or Bumbury mixer. The other additives may be added at any state of the procedure.

The thermoplastic composition and the blends thereof with olefin plastic of the present invention can be processed with conventional devices used for general thermoplastic resins. The composition and its blends are suitable for extrusion and calendaring and are particularly suitable for injection. Because of the partial curing of the component (a), the composition and its blends have excellent rubbery properties, i.e., heat-resistance, anti-weathering property, tensile properties, flexibility, rebound elasticity and high fluidity. Thus, they are easy to mold into large and thick products free of sinkmarks and flowmarks.

The composition and blends of the present invention can be used in the production of a wide range of products: e.g., automobile parts such as body panels, bumper parts, side shields, steering wheels; footwear such as shoe heels and sandals; electric parts such as wire covering, connectors and cap plugs; sporting goods such as grips for golf clubs and baseball bats, swimming fins and water glasses; and such miscellaneous items as gaskets, waterproof sheets, garden hoses and belts. The composition and blends according to the present invention manifest their superior properties most remarkably when applied to the production of a large thick article such as an automobile bumber.

Foamed products can be produced from the above described thermoplastic elastomer composition of the present invention. The method of producing the foamed products comprises:
heating to melt a foamable composition comprising
 100 to 5 parts by weight of a partially cured elastomer composition (A) obtained by dynamic heat-treatment, in the presence of an organic peroxide, of a mixture of
  100 to 50 parts by weight of (a) a peroxide-curable olefin copolymer rubber,
  0 to 50 parts by weight of (b) a peroxide-decomposing olefin plastic,
  wherein the sum of the component (a) and the component (b) is 100 parts by weight,
  5 to 100 parts by weight of at least one member of (c) peroxide-non-curable hydrocarbon rubbery material, and (d) a mineral oil type softener,
 0 to 95 parts by weight of (B) an olefin plastic; the sum of the component (b) and the component (B) accounts for not less than 5 parts by weight among 100 parts by weight of the blend of the component (A) and the component (B);
and
 (c) a decomposition type foaming agent, and molding the molten composition while foaming.

A typical embodiment of the above method comprises:
heating to melt a foamable composition comprising
 a partially cured elastomer composition (A) obtained by dynamic heat-treatment, in the presence of an organic peroxide, of a mixture of
  90 to 50 parts by weight of (a) a peroxide-curable olefin copolymer rubber,
  10 to 50 parts by weight of (b) a peroxide-decomposing olefin plastic,
  wherein the amounts of the components (a) and (b) are chosen to total 100 parts by weight, and 5 to 50 parts by weight of (c) a peroxide-non-curable hydrocarbon rubbery material, and/or (d) a mineral oil type softener, and
 a decomposition type foaming agent (B), and molding the molten composition while foaming.

In this embodiment, the (b) peroxide-decomposing olefin plastic acts to improve the fluidity and heat-resistance of the composition. The amount of this component in the composition should be 10 to 50 parts, preferably 20 to 40 parts by weight, based on 100 parts by weight of the component (a) plus the component (b). More than 50 parts reduces the fluidity and tension at melt, and therefore prevents good foaming. Less than 10 parts is insufficient for molding a foamed product because at such rate of inclusion the heat-resistance and fluidity of the composition become too low.

The proportion of the components (c) and/or (d) to the components (a) plus (b) should be 5 to 50 parts, preferably 20 to 40 parts by weight, to 100 parts by weight of the (a) plus (b). Less than 5 parts by weight does not give a sufficient improvement in fluidity, whereas more than 50 parts by weight degrades the heat-resistance and tensile properties of the composition.

The suitable amount of the organic peroxide to be added in producing formed products is nearly the same as that in producing non-foamed products: 0.05 to 1.0% preferably 0.1 to 0.5% by weight based on the mixture to be treated. If the amount added is too small, the degree of crosslinkage in the cured rubber of (a) will be too low and, as a result, the foamed product will have poor heat-resistance and the tension at melt of the composition will be too low. As a consequence of the low tension at melt the cell size of the foam will become so coarse as to make it impossible to realize the purpose of the invention. If the amount added is too large, the degree of crosslinkage of the cured rubber will become too high and as a result, the fluidity of the composition will become too low. Moreover, the compatibility of the cured rubber with the olefin plastic will be decreased.

In this embodiment, it is preferable to use one of the curing promotors or polyfunctional vinyl monomers, mentioned above; among these, divinyl benzene is especially effective.

The following known decomposition type foaming agents are typical examples of the decomposition type foaming agent of (B) used in the present method: diethyl azocarboxylate, azodicarbonamide, barium azodicarboxylate, 4,4'-oxy bis(benzene sulfonyl hydrazide) and 3,3'-disulfonhydrazide phenyl-sulfon, N,N'-dinitrosopentamethylene tetramine. Taking into account of the temperature at which the elastomer composition is processed, the most preferable among these is azodicarbonamide. The addition amount of the foaming agent of (B) to the elastomer composition of (A) depends on the desirable expansion ratio for the product concerned but is usually 0.01 to 5 parts, preferably 0.1 to 2 parts by weight, based on 100 parts by weight of the component (A). Foaming at molding is difficult to attain with too small amount of the foaming agent, while too large amount causes collapse of foam and consequent unevenness of the surface of the foamed product.

This method of producing a foamed product is based on the discovery that the elastomer composition of (A) obtained by dynamic heat-treatment of the above components (a), (b), (c) and/or (d) to partially cure the mixture of these components exhibits better fluidity than a partially cured elastomer comprising only the components (a) and (b), that the composition (A) can therefore be readily processed by various methods of processing such as injection molding and extrusion molding, and that the properties at melt of the composition (A) are suitable for obtaining fine cell size when foamed.

The partially cured elastomer comprising only the components (a) and (b) has insufficient elongation at melt so that when foamed it produces continuous cells. When a non-cured material such as soft polyolefin is foamed the cells tend to be coarse due to the low tension at melt.

The composition used in the present method of producing foamed products may, in addition to the above described elastomer of (A) and decomposition type foaming agent of (A), further comprise a foaming aid and a wetting agent if these are found necessary.

Examples of the foaming aid are organic acid type aids such as stearic acid, lauric acid and salicylic acid; metal salt type aids such as salt of zinc, calcium, lead or barium of a fatty acid; and urea type aids. Examples of the wetting agent are DOP, DBP, DIDP, chlorinated paraffine, polybutene, liquid paraffine and glycerine.

Also, foamed products can be produced from the above described blends of the thermoplastic elastomer composition and the olefin plastic. The method of producing foamed products comprises:
heating to melt a foamable composition comprising
5 to 95 parts by weight of a partially cured elastomer composition (A) obtained by dynamic heat-treatment, in the presence of an organic peroxide, of a mixture of
100 to 50 parts by weight of (a) a peroxide-curable olefin copolymer rubber,
0 to 50 parts by weight of (b) a peroxide-decomposing olefin plastic,
wherein the amounts of the components (a) and (b) are chosen to total 100 parts by weight, and 5 to 100 parts by weight of (c) a peroxide-non-curable hydrocarbon rubbery material and/or (d) mineral oil type softener, 95 to 5 parts by weight of (B) an olefin plastic, and a decomposition type foaming agent (C), and molding the molten composition while foaming.

In this embodiment, the blend ratio of the elastomer composition of (A) and the olefin plastic of (B) is, in parts by weight, 95/5 to 5/95, preferably 90/10 to 40/60, more preferably 80/20 to 50/50. If foam-processing is carried out by using a foamable composition comprising only the olefin plastic of (B) or containing too small amount of the elastomer composition of (A), there will be displayed a weak point of the (B), namely that it has too low tension at melt and that, in the molten state, its properties are highly temperature dependent, so that, when foamed, it is apt to produce coarse and non-uniform cells.

In this embodiment, which is characterized by the use of the blend of the elastomer composition of (A) and the olefin plastic of (B) as the material of the foamable composition, it is possible to avoid the above problem and to obtain foamed products of uniform cell size and excellent appearance.

The foamable composition used in this embodiment may contain known additives such as a heat-stabilizer, weather-proofing agent, anti-static agent, pigment, dye, flame-retarder, nucleating agent, lubricant, slipping agent, anti-blocking agent and so on. The fillers mentioned earlier can also be used in this embodiment so long as they do not affect the fluidity and rubbery properties of the composition.

Preparation of the blend which is used as the material for the foamable composition may be carried out by the method for producing the blend of the partially cured elastomer composition and the olefin plastic described above in connection with the non-foamed products.

Then, the obtained blend of the elastomer composition and the olefin plastic is mixed with the decomposition type foaming agent and with a foaming aid or wetting agent, if required. The blending may be carried out by, for example, mixing pellets of the blend (A) and the decomposition type foaming agent (B) in a V-shaped blender, tumbler blender, ribbon blender, Henshell mixer, and then, as occasion demands, further kneading in an extruder, mixing roll, kneader or Bumbury mixer. The other additives such as weather-proofing agent, heat-stabilizer, anti-oxidant and coloring substance may be added at any stage of the procedure.

As a method of producing foamed products from the above described foamable composition, it is possible to use the conventional techniques of press molding, injection molding, extrusion molding and callendaring that are normally used in producing foamed products of a low expansion ratio. The press molding may be performed by, for example, charging pellets of the foamable composition in the heated mold of a press molder, and, with or without applying mold pressure, melting and foaming to obtain a foamed product. The temperature of the mold is preferably in the range of 140° to 250° C.

An example of injection molding comprises heating and melting the above described foamable composition in a conventional injection machine so that the composition may foam at the end of the nozzle, and injecting the foaming material into a mold. The temperature of the material at injection is preferably in the range of 140° to 250° C. A typical manner of extrusion comprises melting the foamable composition in an extruder and foaming it at the time of extruding from the die. Preferable temperature of the material during extrusion is also in the range of 140° to 250° C.

Foamed products having a very low expansion ratio falling in the range of 1.05 to 1.3 obtained by the above described methods, particularly those produced by injecttion molding, have almost the same appearance and characteristics as those of non-foamed products, and therefore, they can be used in the same manner. Because of their foamed structure, however, these products have many advantages over non-foamed products. For example, they can easily be produced without sinkmarks even in the case of thick products, they are light in weight, they can be produced with a shorter molding cycle time and they can be produced at lower cost.

Injection molded products of a low expansion ratio ranging between 1.4 and 3 have a thick skin layer and fine cells in the core, and hence, enjoy high dimensional accuracy and good appearance. They are superior to foam rubber products made by foaming in a mold or injection with curing, in their shock-absorbing capacity, elasticity and sound-absorbing capacity.

Foamed products produced by extrusion according to the present method are advantageous over soft olefins products in that they are free of traces of collapsed foam in the skin layer.

In general, because of the partial curing of the component (a), the foamed products of this invention have excellent rubbery properties as regards heat-resistance, weather-resistance, tensile properties, flexibility and rebound elasticity.

Among the foamed products obtained by the present methods using the blends of the elastomer and the olefin plastic, those containing a major amount of the elastomer composition of (A) exhibit excellent rubbery properties as regards heat-resistance, weather-resistance, tensile properties, flexibility and rebound elasticity, namely, properties deriving from the partially cross-linked structure of the component (A). On the other hand, those containing a major amount of the olefin plastic of (B) retain characteristics inherent to the foamed products of olefin plastic, and further, have improved impact-strength and low-temperature resistance.

These foamed products are suitable for almost all uses mentioned above in connection with non-foamed products.

EXAMPLES

The present invention will be further described in detail with reference to the examples given below.

It should be noted that the invention is not limited to these examples.

In the examples, evaluation of processability and properties of the present composition were made as follows:

Testing Methods for Examples 1 through 9 and 22 through 52, and Controls 1 through 5 and 15 through 36.

Injection molding (A) Molding conditions

Injection molding was carried out with the following machine under the conditions given below:

Machine: Dynamelter, made by Meiki Manufacturing Co., Ltd.

Molding temperature: 200° C.

Designed injection pressure: primary 1,300 kg/cm$^2$, secondary 700 kg/cm$^2$

Injection pressure used: maximum

Rate of molding: 90 sec/cycle

Gate: Direct gate; Land: 10 mm long, 10 mm wide and 3 mm thick

Product: Rectangular plates 300 mm in length, 180 mm in width and 3, 8 or 15 mm in thickness (B) Criteria for evaluating product appearance Flowmarks

| Flowmarks | |
|---|---|
| (Mark) | (Standard) |
| 1 | many flowmarks |
| 2 | substantial number of flowmarks throughout the product |
| 3 | a few flowmarks throughout the product |
| 4 | a few flowmarks only on the side opposite to the gate |
| 5 | no flowmarks |
| Sinkmarks | |
| (Mark) | (Standard) |
| O | no sinkmarks |
| Δ | sinkmarks only on the side opposite to the gate |
| x | sinkmarks throughout the product |
| Surface gloss | measured by the method of ASTM D-523 at light incidence angle of 60° |
| (Mark) | (Standard) |
| O | gloss 25% or more |
| Δ | gloss 10 to 25% |
| x | gloss 10% or less |

Extrusion (A) Molding conditions

Extrusion was carried out with the following machine under the conditions given below:

Machine: 40 mm $\phi$ extruder, made by Toshiba Machinery Co., Ltd.

Extruding temperature: 210° C.

Die: straight die; die/core=12.5 mm/10.0 mm

Rate of drawing: 10 m/min.

(B) Criteria for evaluation of product appearance

Unevenness of the product tubes was evaluated on the basis of the following 5 grades:

| (Mark) | (Standard) |
|---|---|
| 5 | very smooth and glossy surface |
| 4 | smooth but non-glossy surface |
| 3 | slight unevenness |
| 2 | significant unevenness |

-continued

| (Mark) | (Standard) |
|---|---|
| 1 | rough wavy surface |

Basic Properties

Test pieces were cut out of the above mentioned 3 mm thick injection molded products and subjected to the following measurements:

Tensile properties: soft olefin plastics by the testing method of JIS K-6301; polypropylene by the testing method of JIS K-7113

Spring hardness: JIS A-type method defined by JIS K-6301

Permanent elongation: testing method of JIS K-6301

Izod impact strength: testing method of ASTM D-256

Vicat softening point: testing method of ASTM D-1525

Heatproof temperature: test pieces were heated in a bath at a temperature increasing rate of 20° C./min. Temperature at which test piece was penetrated by a needle of 0.8 mm diameter under load of 49 g was recorded.

Testing Methods for Examples 10 through 21 and Controls 6 through 14.

Plates 200 mm in length, 200 mm in width and 3 mm in thickness were prepared by using a press molding machine at a molding temperature of 200° C., heating for 10 minutes and cooling for 10 minutes. Test pieces were cut out of these plates for measurements of tensile strength, spring hardness and permanent elongation. The testing methods were as mentioned above.

Testing Methods for foamed products

Injection molding was carried out with the same machine as used for the above mentioned non-foaming molding under the same conditions except that the molding temperature was 180° C., the plates produced were 300 mm long, 180 mm wide and 15 mm thick.

Also, tublar foamed products of an outer diameter of 10 mm and thickness of 2 mm were produced by extrusion using the same extruder as used for the non-foaming extrusion under the same conditions except that the extruding temperature was 160° C.

Rate of expansion: obtained by dividing 0.89 g/cm$^3$, the density of a non-foamed product, by apparent density of the foamed products.

Appearance of the products: Observation was made on unevenness of surface caused by collapse of foam cells. A rating of 5 was given to a substantially smooth surface, 3 to a surface having some unevenness, and 1 to a rough surface caused by collapsed foam cells. A rating of 4 was given to a surface whose state fell between 5 and 3, and a rating of 2 to one falling between 3 and 1.

Tensile strength
Elongation           } measured by the methods
Dimensional change caused by    of JIS K-6767
heat The materials used in the following examples are referred by the following abbreviations:

EPDM-I: ethylene-propylene ethylidene norbornene copolymer rubber, ethylene content 70 molar %, iodine value 15, Mooney's viscosity $ML_{1+4}(100°$ C.) 60

EPDM-II: ethylene-propylene-dicyclopentadiene copolymer rubber, ethylene content 65 molar %, iodine value 13, Mooney's viscosity $ML_{1+4}(100°$ C.) 20

PP: polypropylene, Melt Index (ASTM D-1238-65T, 230° C.) 13, density 0.91 g/cm$^3$ LDPE: low density polyethylene, Melt Index (190° C.) 23, density 0.916 g/cm$^3$ HDPE: high density polyethylene, Melt Index (190° C.) 14, density 0.965 g/cm$^3$, MDPE: ethylene-propylene copolymer, Melt Index (190° C.) 30, density 0.940 g/cm$^3$ EPC: ethylene-propylene copolymer, Melt Index (190° C.) 4, density 0.925 g/cm$^3$ PIB: polyisobutylene, (Vistanex MML-100, made by Esso)

IIR: butyl rubber, Mooney's viscosity $ML_{1+4}(100°$ C.) 45, degree of unsaturation 1.0 molar %

EPR: ethylene-propylene copolymer rubber, ethylene content 71 molar %, iodine value 0, Mooney's viscosity $ML_{1+4}(100°$ C.) 60

EVA: ethylene-vinyl acetate copolymer, Melt Index (190° C.) 30, vinyl acetate content 14% by weight PB: 1,2-polybutadiene Oil: naphthenic process oil Peroxide-A: 1,3-bis(tert.-butyl peroxyisopropyl) benzene DVB: divinyl benzene EGDMA: ethyleneglycol dimethacrylate GM: p-quinone dioxime TAC: triallyl isocyanurate DEG: diethyleneglycol ACA-I: azodicarbonamide type foaming agent, Cellmike CAP-195, made by Sankyo Kasei ACA-II: azodicarbonamide type foaming agent, Cellmike CAP-500

Examples 1 through 21 and Controls 1 through 9 are given to illustrate the partially cured thermoplastic elastomer composition of the present invention.

EXAMPLE 1

(1st step)

| EPDM-I | 70 parts by weight |
|---|---|
| PP | 30 parts by weight |
| Oil | 10 parts by weight | were kneaded in a Bumbury mixer under nitrogen atmosphere at 180° C. for 5 minutes. The mixture was then rolled and pelletized through a sheet cutter.

(2nd step)

The pellets obtained were mixed with a solution of 0.3 parts by weight of Peroxide-A in 0.5 parts by weight of DVB in a tumbler blender so as to uniformly coat the pellets with the solution. The pellets were extruded from an extruder under nitrogen atmosphere at 210° C. to give pellets of the composition according to the invention.

EXAMPLE 2

The procedure of Example 1 was repeated except that the amount of Oil was increased from 10 to 30 parts by weight.

EXAMPLE 3

Example 1 was repeated with amount of Oil increased from 10 to 30 parts by weight, the amount of PP decreased from 30 to 20 parts by weight and with addition of 10 parts by weight of PIB.

EXAMPLE 4

Example 2 was repeated except that the amount of EPDM-I and PP were both made 50 parts by weight.

EXAMPLE 5

Example 3 was repeated except that the amounts of EPDM-I and PP were changed to 50 and 40 parts by weight, respectively.

Control 1

Example 1 was repeated without using Oil.

Control 2

Example 4 was repeated without using Oil.

Control 3

Control 1 was repeated with 0.2 parts by weight of Peroxide-A.

Control 4

Control 1 was repeated with 0.1 parts by weight of Peroxide-A.

The results of the above Examples 1 through 5 and Controls 1 through 4 are shown in Table I.

EXAMPLE 6

Example 3 was repeated using IIR in place of PIB.

EXAMPLE 7

Example 5 was repeated using IIR (the same as used in Example 6) in place of PIB.

EXAMPLE 8

Example 3 was repeated using EPR in place of EPDM-I.

EXAMPLE 9

Example 5 was repeated using EPR in place of EPDM-I.

Control 5

Control 1 was repeated using EPDM-II in place of EPDM-I.

The results of the above Examples 6 through 9 and Control 5 are shown in Table II.

Table I

| | Examples | | | | | Controls | | | |
|---|---|---|---|---|---|---|---|---|---|
| | 1 | 2 | 3 | 4 | 5 | 1 | 2 | 3 | 4 |
| Ingredients | | | | | | | | | |
| EPDM-I | 70 | 70 | 70 | 50 | 50 | 70 | 50 | 70 | 70 |
| PP | 30 | 30 | 20 | 50 | 40 | 30 | 50 | 30 | 30 |
| PIB | | | 10 | | 10 | | | | |
| Oil | 10 | 30 | 30 | 30 | 30 | | | | |
| DVB | 0.5 | 0.5 | 0.5 | 0.5 | 0.5 | 0.5 | 0.5 | 0.5 | 0.5 |
| Peroxide-A | 0.3 | 0.3 | 0.3 | 0.3 | 0.3 | 0.3 | 0.3 | 0.2 | 0.1 |
| Gel content (%) | 86.8 | 73.5 | 68.3 | | | 90.3 | | 65.3 | 53.2 |
| Properties | | | | | | | | | |
| 100% Modulus (kg/cm$^2$) | 40 | 30 | 27 | 48 | 43 | 45 | 50 | 43 | 33 |
| Tensile strength (kg/cm$^2$) | 105 | 100 | 83 | 98 | 91 | 110 | 105 | 80 | 39 |
| Elongation set at break (%) | 620 | 620 | 650 | 580 | 630 | 600 | 550 | 570 | 450 |
| Spring hardness | 82 | 75 | 70 | 88 | 82 | 85 | 95 | 85 | 82 |
| Permanent elongation (%) | 20 | 15 | 10 | 39 | 27 | 20 | 49 | 24 | 30 |
| Heat-proof temperature (°C.) | 140 | 135 | 120 | 140 | 135 | 140 | 140 | 110 | 85 |
| Appearance of products | | | | | | | | | |
| Injection | | | | | | | | | |
| 3 mm thick  Flowmarks | 4 | 5 | 5 | 5 | 5 | 1 | 2 | 1 | 1 |
| Sinkmarks | o | o | o | o | o | o | o | o | o |
| Gloss | Δ | Δ | Δ | o | o | x | Δ | x | x |
| 8 mm thick  Flowmarks | 5 | 5 | 5 | 5 | 5 | 1 | 3 | 1 | 2 |
| Sinkmarks | o | o | o | o | o | o | Δ | o | o |
| Gloss | Δ | Δ | Δ | o | o | x | Δ | x | x |
| 15 mm thick  Flowmarks | 5 | 5 | 5 | 5 | 5 | 1 | 3 | 1 | 2 |
| Sinkmarks | o | o | o | o | o | o | x | o | o |
| Gloss | Δ | Δ | Δ | o | o | x | Δ | x | x |
| Extrusion | 4 | 5 | 5 | 5 | 5 | 1 | 3 | 1 | 2 |

Table II

| | Examples | | | | Control |
|---|---|---|---|---|---|
| | 6 | 7 | 8 | 9 | 5 |
| Ingredients | | | | | |
| EPDM-I | 70 | 50 | | | |
| EPDM-II | | | | | 70 |
| EPR | | | 70 | 50 | |
| PP | 20 | 40 | 20 | 40 | 30 |
| PIB | | | 10 | 10 | |
| IIR | 10 | 10 | | | |
| Oil | 30 | 30 | 30 | 30 | |
| Oil | 30 | 30 | 30 | 30 | |
| DVB | 0.5 | 0.5 | 0.5 | 0.5 | 0.5 |
| Peroxide-A | 0.3 | 0.3 | 0.3 | 0.3 | 0.3 |
| Gel Content (%) | 68.3 | | | | 74.3 |
| Properties | | | | | |
| 100% Modulus (kg/cm$^2$) | 27 | 44 | 29 | 47 | 40 |
| Tensile strength (kg/cm$^2$) | 80 | 90 | 85 | 91 | 70 |
| Elongation et at break (%) | 650 | 600 | 600 | 610 | 400 |
| Spring hardness | 70 | 83 | 72 | 83 | 83 |
| Permanent elongation (%) | 11 | 28 | 13 | 29 | 25 |
| Heat-proof temperature (°C.) | 120 | 135 | 125 | 135 | 125 |
| Appearance of products | | | | | |
| Injection | | | | | |
| 3 mm thick  Flowmarks | 5 | 5 | 5 | 5 | 1 |
| Sinkmarks | o | o | o | o | |
| Gloss | Δ | o | Δ | o | x |
| 8 mm thick  Flowmarks | 5 | 5 | 5 | 5 | 2 |

Table II-continued

|  |  | Examples | | | | Control |
|---|---|---|---|---|---|---|
|  |  | 6 | 7 | 8 | 9 | 5 |
| 15 mm thick | Sinkmarks | o | o | o | o | o |
|  | Gloss | Δ | o | Δ | o | x |
|  | Flowmarks | 5 | 5 | 5 | 5 | 2 |
|  | Sinkmarks | o | o | o | o | o |
|  | Gloss | Δ | o | Δ | o | x |
| Extrusion |  | 5 | 5 | 5 | 5 | 2 |

EXAMPLE 10

(1st step)

| EPDM-I | 70 parts by weight |
|---|---|
| PP | 20 parts by weight |
| PIB | 10 parts by weight |
| Oil | 30 parts by weight | were kneaded in a Bumbury mixer under nitrogen atmosphere at 180° C. for 5 minutes. The mixture was then rolled and pelletized through a sheet cutter.

(2nd step)

The pellets obtained were mixed with a solution of 0.36 parts of weight of Peroxide-A in 0.5 parts by weight of DVB in a tumbler blender at 20° C. for 10 minutes so as to uniformly coat the pellets with the solution. The pellets were extruded from an extruder of 40 mm φ under nitrogen atmosphere at 210° C. to give pellets of the composition according to the invention.

EXAMPLE 11

The procedure of Example 10 was repeated except that DVB was not added in the second step.

EXAMPLE 12

Example 10 was repeated except that PIB was not used and the amount of PP was 30 parts by weight.

EXAMPLE 13

Example 10 was repeated without using Oil.

EXAMPLE 14

Example 12 was repeated without using Oil.

Control 6

Example 12 was repeated without using Oil.

EXAMPLE 15

Example 14 was repeated using a slightly decreased amount of Peroxide-A. 30 parts by weight of pellets of thus obtained composition was further blended with 100 parts by weight of EPC in a tumbler blender, and then extruded from an extruder at 210° C.

The results of the above Examples 10 through 15 and Control 6 are shown in Table III.

Table III

|  | Examples | | | | | Control | Example |
|---|---|---|---|---|---|---|---|
|  | 10 | 11 | 12 | 13 | 14 | 6 | 15 |
| Ingredients | | | | | | | |
| (1st step) | | | | | | | |
| EPDM | 70 | 70 | 70 | 70 | 70 | 70 | 70 |
| PP | 20 | 20 | 30 | 30 | 30 | 30 | 30 |
| PIB | 10 | 10 | | | | | |
| Oil | 30 | 30 | 30 | 30 | | | |
| (2nd step) | | | | | | | |
| DVB | 0.5 | | 0.5 | | 0.5 | | 0.5 |
| Peroxide-A | 0.36 | 0.36 | 0.36 | 0.36 | 0.36 | 0.36 | 0.3 |
| Olefin plastic | | | | | | | |
| Properties | | | | | | | |
| 100% Modulus (kg/cm²) | 27 | 25 | 32 | 28 | 48 | 42 | 85 |
| Tensile strength (kg/cm²) | 83 | 70 | 105 | 82 | 132 | 94 | 130 |
| Elongation set at break (%) | 640 | 640 | 610 | 630 | 550 | 610 | 580 |
| Spring hardness | 71 | 69 | 77 | 75 | 82 | 81 | 98 |
| Permanent elongation (%) | 10 | 16 | 14 | 19 | 16 | 24 | 48 |

EXAMPLES 16, 17 and 18, and Controls 7 and 8

Example 14 was repeated five times except that the amount of Peroxide-A used in the second step was 0.18 parts by weight, and that the amounts of DVB were as shown in Table IV.

EXAMPLES 19, 20 and 21

Example 14 was repeated using different amounts of Peroxide-A as shown in Table IV.

Control 9

Example 14 was repeated with omission of the second step.

The results of the above Examples 16 through 21 and Controls 7 through 9 are shown in Table IV.

Table IV

|  | Examples | | | Controls | | Examples | | | Control |
|---|---|---|---|---|---|---|---|---|---|
|  | 16 | 17 | 18 | 7 | 8 | 19 | 20 | 21 | 9 |
| Ingredients | | | | | | | | | |
| EPDM | 70 | 70 | 70 | 70 | 70 | 70 | 70 | 70 | 70 |
| PP | 30 | 30 | 30 | 30 | 30 | 30 | 30 | 30 | 30 |
| DVB | 0.3 | 1.0 | 1.5 | 3.0 | 8.0 | 0.5 | 0.5 | 0.5 | — |
| Peroxide-A | 0.18 | 0.18 | 0.18 | 0.18 | 0.18 | 0.21 | 0.28 | 0.48 | — |
| Properties | | | | | | | | | |

Table IV-continued

|  | Examples | | | Controls | | Examples | | | Control |
| --- | --- | --- | --- | --- | --- | --- | --- | --- | --- |
|  | 16 | 17 | 18 | 7 | 8 | 19 | 20 | 21 | 9 |
| 100% Modulus (kg/cm²) | 44 | 50 | 46 | 45 | 46 | 47 | 48 | 55 | 36 |
| Tensile strength (kg/cm²) | 112 | 106 | 96 | 68 | 69 | 102 | 130 | 164 | 39 |
| Elongation set at break (%) | 660 | 610 | 540 | 460 | 460 | 590 | 590 | 540 | 350 |
| Spring hardness | 81 | 82 | 84 | 34 | 35 | 79 | 79 | 83 | 73 |
| Permanent elongation (%) | 26 | 24 | 24 | 23 | 22 | 21 | 19 | 12 | 60 |
| Remarks |  |  |  | significant order |  |  |  | low fluidity |  |

Control 10

Example 14 was repeated using EGDMA in place of DVB.

Control 11

Example 14 was repeated using 0.6 parts by weight of GM in place of DVB in the second step.

Control 12

Example 14 was repeated using 0.6 parts by weight of TAC in place of DVB in the second step.

Control 13

Example 14 was repeated using 1.0 parts by weight of DEG in place of DVB.

Control 14

Example 14 was repeated using 2.0 parts by weight of PB in place of DVB.

The evaluation of the compositions according to the above Controls 10 through 14 are given in Table V.

Table V

|  | Controls | | | | |
| --- | --- | --- | --- | --- | --- |
|  | 10 | 11 | 12 | 13 | 14 |
| Ingredients |  |  |  |  |  |
| (1st step) |  |  |  |  |  |
| EPDM | 70 | 70 | 70 | 70 | 70 |
| PP | 30 | 30 | 30 | 30 | 30 |
| (2nd step) |  |  |  |  |  |
| EGDMA | 0.5 |  |  |  |  |
| GM |  | 0.6 |  |  |  |
| TAC |  |  | 0.6 |  |  |
| DEG |  |  |  | 1.0 |  |
| PB |  |  |  |  | 2.0 |
| Peroxide-A | 0.36 | 0.36 | 0.36 | 0.36 | 0.36 |
| Properties |  |  |  |  |  |
| 100% Modulus (kg/cm²) | 42 | 44 | 41 | 39 | 43 |
| Tensile strength (kg/cm²) | 101 | 94 | 93 | 83 | 88 |
| Elongation set at break (%) | 570 | 530 | 510 | 550 | 540 |
| Spring hardness | 81 | 82 | 81 | 80 | 80 |
| Permanent elongation (%) | 20 | 23 | 21 | 25 | 21 |

Examples 22 through 33 and Controls 15 through 20 illustrate blends of partially cured thermoplastic elastomer and olefin plastic, in which the former is major.

EXAMPLE 22

(1st step)

| EPDM-I | 70 parts by weight |
| --- | --- |
| PP | 20 parts by weight |
| PIB | 10 parts by weight |
| Oil | 30 parts by weight | were kneaded in a Bumbury mixer under nitrogen atmosphere at 180° C. for 5 minutes. The mixture was then rolled and pelletized through a sheet cutter.

(2nd step)

The pellets obtained were mixed with a solution of 0.3 parts by weight of Peroxide-A in 0.5 parts by weight of DVB in a tumbler blender so as to uniformly coat the pellets with the solution. The pellets were treated in an extruder under nitrogen atmosphere at 210° C.

(3rd step)

100 parts by weight of the pellets from the second step and 40 parts by weight of PP pellets were mixed in a tumbler blender, and the mixture was extruded to give the desired composition.

EXAMPLE 23

The procedure was the same as that of Example 22 except that the amount of PP pellets was changed to 100 parts by weight in the third step.

EXAMPLE 24

The procedure was the same as that of Example 22 except that LDPE was used instead of PP in the third step.

EXAMPLE 25

The procedure was the same as that of Example 22 except that a mixture of 20 parts by weight of HDPE and 20 parts by weight of MDPE was used instead of 40 parts by weight of PP in the third step.

EXAMPLE 26

The procedure was the same as that of Example 22 except that EVA was used instead of PP in the third step.

EXAMPLE 27

Evaluation was made on the intermediate product of the second step in Example 22.

Control 15

The procedure was the same as that of Example 22 except that the amount of PP was changed to 30 parts by weight and Oil was omitted.

Control 16

The procedure was the same as that of Reference 22 except that the amount of PP was changed to 30 parts by weight and PIB and Oil were omitted.

The results of the above Examples 22 through 26, and Controls 16 and 17 are given in Table VI.

Table VI

|  |  | Examples |  |  |  |  |  | Controls |  |
|---|---|---|---|---|---|---|---|---|---|
|  |  | 22 | 23 | 24 | 25 | 26 | 27 | 15 | 16 |
| Ingredients |  |  |  |  |  |  |  |  |  |
| (1st step) |  |  |  |  |  |  |  |  |  |
| EPDM |  | 70 | 70 | 70 | 70 | 70 | 70 | 70 | 70 |
| PP |  | 20 | 20 | 20 | 20 | 20 | 20 | 30 | 30 |
| PIB |  | 10 | 10 | 10 | 10 | 10 | 10 |  |  |
| Oil |  | 30 | 30 | 30 | 30 | 30 | 30 |  |  |
| (2nd step) |  |  |  |  |  |  |  |  |  |
| DVB |  | 0.5 | 0.5 | 0.5 | 0.5 | 0.5 | 0.5 | 0.5 | 0.5 |
| Peroxide-A |  | 0.3 | 0.3 | 0.3 | 0.3 | 0.3 | 0.3 | 0.3 | 0.3 |
| (3rd step) |  |  |  |  |  |  |  |  |  |
| Olefin Plastic |  | PP | PP | LDPE | HDPE/MDPE | EVA | — | PP | — |
|  |  | 52 | 130 | 52 | 26/26 | 52 | — | 40 | — |
| Properties |  |  |  |  |  |  |  |  |  |
| 100% Modulus (kg/cm$^2$) |  | 52 | 59 | 48 | 50 | 45 | 27 | 55 | 45 |
| Tensile strength (kg/cm$^2$) |  | 110 | 130 | 102 | 105 | 100 | 83 | 130 | 110 |
| Elongation set at break (%) |  | 610 | 620 | 600 | 600 | 630 | 650 | 610 | 600 |
| Spring hardness |  | 85 | 92 | 80 | 83 | 79 | 70 | 90 | 85 |
| Permanent elongation (%) |  | 28 | 36 | 26 | 27 | 22 | 10 | 33 | 20 |
| Heat-proof temperature (°C.) |  | 145 | 150 | 120 | 125 | 115 | 130 | 146 | 140 |
| Appearance of products |  |  |  |  |  |  |  |  |  |
| Injection |  |  |  |  |  |  |  |  |  |
| 3mm thick | Flowmarks | 5 | 5 | 5 | 5 | 5 | 5 | 3 | 1 |
|  | Sinkmarks | o | o | o | o | o | o | o | o |
|  | Gloss | o | o | o | o | o | Δ | o | x |
| 8 mm thick | Flowmarks | 5 | 5 | 5 | 5 | 5 | 5 | 3 | 1 |
|  | Sinkmarks | o | o | o | o | o | o | o | o |
|  | Gloss | o | o | o | o | o | Δ | o | x |
| 15 mm thick | Flowmarks | 5 | 5 | 5 | 5 | 5 | 5 | 3 | 1 |
|  | Sinkmarks | o | o | o | o | o | o | o | o |
|  | Gloss | o | o | o | o | o | Δ | o | x |
| Extrusion |  | 5 | 5 | 5 | 5 | 5 | 5 | 3 | 1 |

EXAMPLE 28

The procedure was the same as that of Example 22 except that 100 parts by weight of EDPM-I and 30 parts by weight of Oil were used in the first step.

EXAMPLE 29

The procedure was the same as that of Example 28 except that MDPE was used instead of PP in the third step.

EXAMPLE 30

The procedure was the same as that of Example 28 except that EVA was used instead of PP in the third step.

EXAMPLE 31

The procedure was the same as that of Example 22 except that a mixture of 90 parts by weight of EPDM, 10 parts by weight of PIB and 30 parts by weight of Oil was used in the first step.

EXAMPLE 32

The procedure was the same as that of Example 31 except that MDPE was used instead of PP in the third step.

EXAMPLE 33

The procedure was the same as that of Example 31 except that EVA was used instead of PP in the third step.

Control 17

The procedure was the same as that of Example 28 except that Oil was not used in the first step.

Control 18

The procedure was the same as that of Control 17 except that the amount of PP was changed to 100 parts by weight in the third step.

Control 19

The procedure was the same as that of Control 17 except that HDPE was used instead of PP in the third step.

Control 20

The procedure was the same as that of Control 19 except that the amount of HDPE was changed to 100 parts by weight in the third step.

The results of the above Examples 28 through 33 and Controls 17 through 20 are given in Table VII.

Table VII

|  | Examples |  |  |  |  |  | Controls |  |  |  |
|---|---|---|---|---|---|---|---|---|---|---|
|  | 28 | 29 | 30 | 31 | 32 | 33 | 17 | 18 | 19 | 20 |
| Ingredients |  |  |  |  |  |  |  |  |  |  |
| (1st step) |  |  |  |  |  |  |  |  |  |  |
| EPDM | 100 | 100 | 100 | 90 | 90 | 90 | 100 | 100 | 100 | 100 |

Table VII-continued

| | Examples | | | | | | Controls | | | |
|---|---|---|---|---|---|---|---|---|---|---|
| | 28 | 29 | 30 | 31 | 32 | 33 | 17 | 18 | 19 | 20 |
| PIB | | | | 10 | 10 | 10 | | | | |
| Oil | 30 | 30 | 30 | 30 | 30 | 30 | | | | |
| (2nd step) | | | | | | | | | | |
| DVB | 0.5 | 0.5 | 0.5 | 0.5 | 0.5 | 0.5 | 0.5 | 0.5 | 0.5 | 0.5 |
| Peroxide-A | 0.3 | 0.3 | 0.3 | 0.3 | 0.3 | 0.3 | 0.3 | 0.3 | 0.3 | 0.3 |
| (3rd step) | | | | | | | | | | |
| PP | 52 | | | 52 | | | 40 | 100 | | |
| MDPE | | 52 | | | 52 | | | | | |
| EVA | | | 52 | | | 52 | | | | |
| HDPE | | | | | | | | | 40 | 100 |
| Properties | | | | | | | | | | |
| 100% Modulus (kg/cm$^2$) | 40 | 39 | 37 | 39 | 39 | 36 | 44 | 52 | 40 | 51 |
| Tensile strength (kg/cm$^2$) | 73 | 70 | 68 | 72 | 70 | 68 | 75 | 95 | 62 | 108 |
| Elongation set at break (%) | 700 | 680 | 690 | 700 | 690 | 700 | 720 | 530 | 680 | 600 |
| Spring hardness | 80 | 79 | 75 | 78 | 77 | 73 | 83 | 95 | 82 | 93 |
| Permanent elongation (%) | 24 | 24 | 20 | 23 | 23 | 20 | 26 | 51 | 25 | 47 |
| Heat-proof temperature (°C.) | 140 | 135 | 120 | 135 | 130 | 115 | 125 | 140 | 120 | 125 |
| Appearance of products | | | | | | | | | | |
| Injection | | | | | | | | | | |
| 3 mm thick Flowmarks | 5 | 5 | 5 | 5 | 5 | 5 | 1 | 2 | 1 | 2 |
| Sinkmarks | o | o | o | o | o | o | o | o | o | o |
| Gloss | Δ | Δ | Δ | o | o | o | x | Δ | x | Δ |
| 8 mm thick Flowmarks | 5 | 5 | 5 | 5 | 5 | 5 | 1 | 3 | 1 | 3 |
| Sinkmarks | o | o | o | o | o | o | o | Δ | o | Δ |
| Gloss | Δ | Δ | Δ | o | o | o | x | Δ | x | Δ |
| 15 mm thick Flowmarks | 5 | 5 | 5 | 5 | 5 | 5 | 1 | 3 | 1 | 3 |
| Sinkmarks | o | o | o | o | o | o | o | x | o | x |
| Gloss | Δ | Δ | Δ | o | o | o | x | Δ | x | Δ |
| Extrusion | 5 | 5 | 5 | 5 | 5 | 5 | 1 | 3 | 1 | 3 |

Examples 34 through 52 and Controls 21 through 36 illustrate blends of partially cured thermoplastic elastomer and olefin plastic, in which the later is major.

EXAMPLE 34

(1st step)

| EPDM | 70 parts by weight |
|---|---|
| PP | 20 parts by weight |
| PIB | 10 parts by weight |
| Oil | 30 parts by weight | were kneaded in a Bumbury mixer under nitrogen atmosphere at 180° C. for 5 minutes. The mixture was then rolled and pelletized through a sheet cutter.

(2nd step)

The pellets obtained were mixed with a solution of 0.3 parts by weight of Peroxide-A in 0.5 parts by weight of DVB in a tumbler blender so as to uniformly coat the pellets with the solution. The pellets were treated in an extruder under nitrogen atmosphere at 210° C.

(3rd step)

30 parts by weight of the pellets obtained from the second step and 100 parts by weight of EPC pellets were mixed in a tumbler blender, and the mixture was extruded to give the desired composition.

EXAMPLES 35 and 36

The procedure was the same as that of Example 34 except that the amount of the pellets from the second step varied as shown in Table VIII.

Control 21

A test piece was made of EPC only and evaluated.

Control 22

Evaluation was made on a composition comprising 100 parts by weight of EPC and 30 parts by weight of EPDM-I.

The results of the above Controls 21 and 22 are also shown in Table VIII.

Table VIII

| | Examples | | | Controls | |
|---|---|---|---|---|---|
| | 34 | 35 | 36 | 21 | 22 |
| Ingredients | | | | | |
| Elastomer Composition | | | | | |
| (1st step) | | | | | |
| EPDM | 70 | 70 | 70 | — | — |
| PP | 20 | 20 | 20 | — | — |
| PIB | 10 | 10 | 10 | — | — |
| Oil | 30 | 30 | 30 | — | — |
| (2nd step) | | | | | |
| DVB | 0.5 | 0.5 | 0.5 | — | — |
| Peroxide-A | 0.3 | 0.3 | 0.3 | — | — |
| (3rd step) | | | | | EPDM |
| Amount | 30 | 10 | 100 | — | 30 |
| Olefin Plastic | EPC | EPC | EPC | EPC | EPC |
| | 100 | 100 | 100 | 100 | 100 |
| Properties | | | | | |
| 100% Modulus (kg/cm$^2$) | 84 | 105 | 80 | 120 | 70 |
| Tensile strength (kg/cm$^2$) | 128 | 140 | 120 | 160 | 120 |
| Elongation set at break (%) | 550 | 650 | 550 | 700 | 600 |
| Spring hardness | 96 | 98 | 92 | 99 | 96 |
| Permanent elongation (%) | 46 | 53 | 35 | 60 | 50 |
| Heat-proof temperature (°C.) | 108 | 106 | 120 | 105 | 85 |
| Appearance of products | | | | | |
| 3 mm thick Flowmark | 5 | 5 | 5 | 5 | 3 |
| Sinkmarks | o | o | o | o | o |
| 8 mm Flowmarks | 5 | 5 | 5 | 5 | 3 |
| Sinkmarks | o | o | o | Δ | o |
| 15 mm thick Flowmarks | 5 | 5 | 5 | 5 | 3 |
| Sinkmarks | Δ | o | o | x | x |

EXAMPLE 37

The procedure was the same as that of Example 34 except that LDPE was used instead of EPC in the third step.

EXAMPLE 38

The procedure was the same as that of Example 35 except that LDPE was used instead of EPC in the third step.

EXAMPLE 39

The procedure was the same as that of Example 36 except that LDPE was used instead of EPC in the third step.

EXAMPLE 40

The procedure was the same as that of Example 34 except that the amounts of EPDM and PP in the first step were changed to 50 and 40 parts by weight, respectively, and LDPE was used instead of EPC in the third step.

EXAMPLES 41 and 42

The procedure was the same as that of Example 40 except that the amount of the pellets from the second step was changed as shown in Table IX.

The results of the evaluation on the composition of the above Examples 37 through 42 are given in Table IX.

Table IX

| | Examples | | | | | |
|---|---|---|---|---|---|---|
| | 37 | 38 | 39 | 40 | 41 | 42 |
| Ingredients | | | | | | |
| Elastomer Composition | | | | | | |
| (1st step) | | | | | | |
| EPDM | 70 | 70 | 70 | 50 | 50 | 50 |
| PP | 20 | 20 | 20 | 40 | 40 | 40 |
| PIB | 10 | 10 | 10 | 10 | 10 | 10 |
| Oil | 30 | 30 | 30 | 30 | 30 | 30 |
| (2nd step) | | | | | | |
| DVB | 0.5 | 0.5 | 0.5 | 0.5 | 0.5 | 0.5 |
| Peroxide-A | 0.3 | 0.3 | 0.3 | 0.3 | 0.3 | 0.3 |
| (3rd step) | | | | | | |
| Amount | 30 | 10 | 100 | 30 | 10 | 100 |
| Olefin Plastic | LDPE | LDPE | LDPE | LDPE | LDPE | LDPE |
| | 100 | 100 | 100 | 100 | 100 | 100 |
| Properties | | | | | | |
| 100% Modulus (kg/cm$^2$) | 63 | 80 | 60 | 75 | 85 | 70 |
| Tensile strength (kg/cm$^2$) | 90 | 93 | 90 | 98 | 95 | 100 |
| Elongation set at break (%) | 400 | 430 | 380 | 440 | 440 | 430 |
| Spring hardness | 93 | 95 | 90 | 93 | 95 | 92 |
| Permanent elongation (%) | 45 | 50 | 32 | 45 | 50 | 40 |
| Heat-proof temperature (°C.) | 89 | 86 | 115 | 115 | 90 | 125 |
| Appearance of products | | | | | | |
| 3 mm thick Flowmarks | 5 | 5 | 5 | 5 | 5 | 5 |
| Sinkmarks | o | o | o | o | o | o |
| 8 mm thick Flowmarks | 5 | 5 | 5 | 5 | 5 | 5 |
| Sinkmarks | o | Δ | o | o | Δ | 0 |
| 15 mm thick Flowmarks | 5 | 5 | 5 | 5 | 5 | 5 |
| Sinkmarks | o | Δ | o | o | Δ | o |

Control 23

Evaluation was made on LDPE alone.

Control 24

Evaluation was made on a composition comprising 100 parts by weight of LDPE and 30 parts by weight of EPDM.

Control 25

Evaluation was made on a composition comprising 100 parts by weight of LDPE and 30 parts by weight of EPR.

Control 26

The procedure was the same as that of Control D3 except that LDPE was used instead of EPC.

Control 27

The procedure was the same as that of Control D7 except that the amount of the pellets from the second step was changed to 50 parts by weight.

The results of the above Controls 23 through 27 are given in Table X.

Table X

| | Controls | | | | |
|---|---|---|---|---|---|
| | 23 | 24 | 25 | 26 | 27 |
| Ingredients | | | | | |
| Elastomer Composition | | | | | |
| (1st step) | | | | | |
| EPDM | — | — | — | 70 | 70 |
| PP | — | — | — | 30 | 30 |
| (2nd step) | | | | | |
| DVB | — | — | — | 0.5 | 0.5 |
| Peroxide-A | — | — | — | 0.3 | 0.3 |
| (3rd step) | | EPDM | EPR | | |
| Amount | — | 30 | 30 | 30 | 50 |

Table X-continued

|  | | Controls | | | | |
| --- | --- | --- | --- | --- | --- | --- |
|  | | 23 | 24 | 25 | 26 | 27 |
| Olefin Plastic | | LDPE | LDPE | LDPE | LDPE | LDPE |
|  | | 100 | 100 | 100 | 100 | 100 |
| Properties | | | | | | |
| 100% Modulus (kg/cm$^2$) | | 90 | 60 | 58 | 65 | 75 |
| Tensile strength (kg/cm$^2$) | | 95 | 85 | 82 | 90 | 93 |
| Elongation set at break (%) | | 450 | 400 | 390 | 400 | 400 |
| Spring hardness | | 96 | 92 | 92 | 94 | 92 |
| Permanent elongation (%) | | 55 | 50 | 50 | 48 | 45 |
| Heat-proof temperature (°C.) | | 85 | 75 | 74 | 90 | 95 |
| Appearance of products | | | | | | |
| 3 mm thick | Flowmarks | 5 | 4 | 4 | 3 | 2 |
|  | Sinkmarks | Δ | o | o | o | o |
| 8 mm thick | Flowmarks | 5 | 4 | 4 | 3 | 2 |
|  | Sinkmarks | x | Δ | Δ | o | o |
| 15 mm thick | Flowmarks | 5 | 4 | 4 | 3 | 2 |
|  | Sinkmarks | x | x | x | o | o |

EXAMPLES 43, 44, 45, 46, 47 and 48

The procedure was the same as that of Examples 37 through 42 except that EVA was used instead of LDPE.

The results of these Examples are given in Table XI.

Controls 28, 29, 30, 31 and 32

The procedure was the same as that of Controls 23 through 27 except that EVA was used instead of LDPE.

The results of these Controls are given in Table XII.

Table XI

|  | | Examples | | | | | |
| --- | --- | --- | --- | --- | --- | --- | --- |
|  | | 43 | 44 | 45 | 46 | 47 | 48 |
| Ingredients | | | | | | | |
| Elastomer Composition | | | | | | | |
| (1st step) | | | | | | | |
| EPDM | | 70 | 70 | 70 | 50 | 50 | 50 |
| PP | | 20 | 20 | 20 | 40 | 40 | 40 |
| PIB | | 10 | 10 | 10 | 10 | 10 | 10 |
| Oil | | 30 | 30 | 30 | 30 | 30 | 30 |
| (2nd step) | | | | | | | |
| DVB | | 0.5 | 0.5 | 0.5 | 0.5 | 0.5 | 0.5 |
| Peroxide-A | | 0.3 | 0.3 | 0.3 | 0.3 | 0.3 | 0.3 |
| (3rd step) | | | | | | | |
| Amount | | 30 | 10 | 100 | 30 | 10 | 100 |
| Olefin Plastic | | EVA | EVA | EVA | EVA | EVA | EVA |
|  | | 100 | 100 | 100 | 100 | 100 | 100 |
| Properties | | | | | | | |
| 100% Modulus (kg/cm$^2$) | | 48 | 53 | 40 | 52 | 54 | 50 |
| Tensile strength (kg/cm$^2$) | | 125 | 130 | 120 | 135 | 140 | 130 |
| Elongation set at break (%) | | 550 | 600 | 550 | 600 | 600 | 550 |
| Spring hardness | | 91 | 92 | 88 | 92 | 93 | 90 |
| Permanent elongation (%) | | 28 | 33 | 20 | 30 | 33 | 25 |
| Heat-proof temperature (°C.) | | 75 | 70 | 90 | 80 | 71 | 95 |
| Appearance of products | | | | | | | |
| 3 mm thick | Flowmarks | 5 | 5 | 5 | 5 | 5 | 5 |
|  | Sinkmarks | o | o | o | o | Δ | o |
| 6 mm thick | Flowmarks | 5 | 5 | 5 | 5 | 5 | 5 |
|  | Sinkmarks | o | Δ | o | o | Δ | o |
| 8 mm thick | Flowmarks | 5 | 5 | 5 | 5 | 5 | 5 |
|  | Sinkmarks | o | Δ | o | o | Δ | o |

Table XII

|  | Controls | | | | |
| --- | --- | --- | --- | --- | --- |
|  | 28 | 29 | 30 | 31 | 32 |
| Ingredients | | | | | |
| Elastomer Composition | | | | | |
| (1st step) | | | | | |
| EPDM | — | — | — | 70 | 70 |
| PP | — | — | — | 30 | 30 |
| (2nd step) | | | | | |
| DVB | — | — | — | 0.5 | 0.5 |
| Peroxide-A | — | — | — | 0.3 | 0.3 |
| (3rd step) | | | | | |
| Amount | — | EPDM | EPR | | |
|  |  | 30 | 30 | 30 | 50 |
| Olefin Plastic | EVA | EVA | EVA | EVA | EVA |

Table XII-continued

|  | Controls | | | | |
| --- | --- | --- | --- | --- | --- |
|  | 28 | 29 | 30 | 31 | 32 |
|  | 100 | 100 | 100 | 100 | 100 |
| Properties | | | | | |
| 100% Modulus (kg/cm$^2$) | 55 | 40 | 39 | 50 | 58 |
| Tensile strength (kg/cm$^2$) | 140 | 100 | 85 | 120 | 150 |
| Elongation set at break (%) | 750 | 700 | 700 | 650 | 650 |
| Spring hardness | 93 | 89 | 89 | 91 | 92 |
| Permanent elongation (%) | 35 | 33 | 32 | 33 | 30 |
| Heat-proof temperature (°C.) | 65 | 58 | 57 | 75 | 80 |
| Appearance of products | | | | | |
| 3 mm thick  1st step | 5 | 4 | 4 | 3 | 2 |
|  | Δ | o | o | o | o |
| 8 mm thick  2nd step | 5 | 4 | 4 | 3 | 2 |
|  | x | Δ | Δ | o | o |
| 15 mm thick  3rd step | 5 | 4 | 4 | 3 | 2 |
|  | x | x | x | o | o |

EXAMPLE 49

The procedure was the same as that of Example 34 except that PP was used instead of EPC in the third step.

EXAMPLE 50

The procedure was the same as that of Example 49 except that the amount of the pellets from the second step was changed to 50 parts by weight in the third step.

EXAMPLE 51

The procedure was the same as that of Example 40 except that PP was used instead of LDPE in the third step.

EXAMPLE 52

The procedure was the same as that of Example 51 except that the amount of the pellets from the second step was changed to 50 parts by weight.

Controls 33, 34, 35 and 36

The procedure was the same as that of Controls 28 through 31 except that PP was used instead of EVA.

The results of the above Examples 49 through 52 and Controls 33 through 36 are given in Table XIII.

Table XIII

|  |  | Examples | | | | Controls | | | |
| --- | --- | --- | --- | --- | --- | --- | --- | --- | --- |
|  |  | 49 | 50 | 51 | 52 | 33 | 34 | 35 | 36 |
| Ingredients | | | | | | | | | |
| Elastomer Composition | | | | | | | | | |
| (1st step) | | | | | | | | | |
| EPDM | | 70 | 70 | 50 | 50 | — | — | — | 70 |
| PP | | 20 | 20 | 40 | 40 | — | — | — | 30 |
| PIB | | 10 | 10 | 10 | 10 | — | — | — | — |
| Oil | | 30 | 30 | 30 | 30 | — | — | — | — |
| (2nd step) | | | | | | | | | |
| DVB | | 0.5 | 0.5 | 0.5 | 0.5 | — | — | — | 0.5 |
| Peroxide-A | | 0.3 | 0.3 | 0.3 | 0.3 | — | — | — | 0.3 |
| (3rd step) | | | | | | | EPDM | EPR | |
| Amount | | 30 | 50 | 30 | 50 | — | 30 | 30 | 30 |
| Olefin Plastic | | PP | PP | PP | PP | PP | PP | PP | PP |
|  | | 100 | 100 | 100 | 100 | 100 | 100 | 100 | 100 |
| Properties | | | | | | | | | |
| Tensile | | | | | | | | | |
| Stress at yield point (kg/cm$^2$) | | 185 | 160 | 200 | 175 | 340 | 180 | 170 | 190 |
| Tensile strength at break (kg/cm$^2$) | | 270 | 250 | 290 | 260 | 410 | 200 | 180 | 280 |
| Elongation at break (%) | | 650 | 630 | 670 | 620 | 800 | 500 | 480 | 720 |
| Izod impact strength (kg·cm/cm$^2$) | 23° C. | . | no break | | | 1.5 | | no break | |
|  | 0° C. | | no break | | | 1.5 | | no break | |
| Vicat softening point (°C.) | | 133 | 131 | 139 | 137 | 155 | 125 | 122 | 135 |
| Appearance of products | | | | | | | | | |
| 3 mm thick  Flowmarks | | 5 | 5 | 5 | 5 | 5 | 4 | 4 | 3 |
| Sinkmarks | | o | o | o | o | Δ | o | o | o |
| 8 mm thick  Flowmarks | | 5 | 5 | 5 | 5 | 5 | 4 | 4 | 3 |
| Sinkmarks | | o | o | o | o | x | Δ | Δ | o |
| 15 mm thick  Flowmarks | | 5 | 5 | 5 | 5 | 5 | 4 | 4 | 3 |
| Sinkmarks | | o | o | o | o | x | x | x | Δ |

The following Examples 53 through 79 and Controls 37 through 45 illustrate foamed products of thermoplastic elastomer composition.

EXAMPLE 53

(1st step)

| EPDM-I | 70 parts by weight |
| --- | --- |
| PP | 30 parts by weight |
| Oil | 10 parts by weight | were kneaded in a Bumbury mixer under nitrogen atmosphere at 180° C. for 5 minutes. The mixture was then rolled and pelletized through a sheet cutter.

(2nd step)

The pellets obtained were mixed with a solution of 0.3 parts by weight of Peroxide-A in 0.5 parts by weight of DVB in a tumbler blender so as to uniformly coat the pellets with the solution. The pellets were treated in an extruder under nitrogen atmosphere at 210° C.

(3rd step)

30 parts by weight of the thermoplastic elastomer obtained from the second step was mixed with 0.3 parts by weight of ACA-I in a tumbler blender.

The mixture was injection molded according to the above mentioned method, and the foamed products were examined.

EXAMPLES 54 and 55

The steps of Example 53 were conducted with the amount of ACA-I changed to 0.5 and 0.7 parts by weight.

EXAMPLE 56

The steps of Example 53 were further conducted with the amount of Oil increased from 10 to 30 parts by weight.

EXAMPLES 57 AND 58

The steps of Example 56 were conducted with the amount of ACA-I changed to 0.5 and 0.7 parts by weight.

EXAMPLE 59

The steps of Example 53 were conducted with the amount of Oil increased from 10 to 30 parts by weight, the amount of PP decreased from 30 to 20 parts by weight, and with addition of 10 parts by weight of PIB.

EXAMPLES 60 AND 61

The steps of Example 59 were conducted with the amount of ACA-I changed to 0.5 and 0.7 parts by weight.

Table XIV shows the results of the above Examples 53 through 61.

Table XIV

| | Examples | | | | | | | | |
|---|---|---|---|---|---|---|---|---|---|
| | 53 | 54 | 55 | 56 | 57 | 58 | 59 | 60 | 61 |
| Ingredients | | | | | | | | | |
| Thermoplastic Elastomer | | | | | | | | | |
| EPDM | 70 | 70 | 70 | 70 | 70 | 70 | 70 | 70 | 70 |
| PP | 30 | 30 | 30 | 30 | 30 | 30 | 20 | 20 | 20 |
| PIB | | | | | | | 10 | 10 | 10 |
| Oil | 10 | 10 | 10 | 30 | 30 | 30 | 30 | 30 | 30 |
| Amount | 100 | 100 | 100 | 100 | 100 | 100 | 100 | 100 | 100 |
| Foaming Agent | | | | | | | | | |
| ACA-I | 0.3 | 0.5 | 0.7 | 0.3 | 0.5 | 0.7 | 0.3 | 0.5 | 0.7 |
| Evaluation | | | | | | | | | |
| Ratio of expansion | 1.19 | 1.40 | 1.60 | 1.21 | 1.40 | 1.73 | 1.22 | 1.44 | 1.76 |
| Appearance of products | 5 | 4 | 3 | 5 | 5 | 4 | 5 | 5 | 4 |
| Average cell size ( ) | 350 | 200 | 100 | 380 | 250 | 150 | 350 | 200 | 100 |
| Uniformity of cells | o | ⊙ | ⊙ | o | ⊙ | ⊙ | o | ⊙ | ⊙ |
| Thickness of skin layer (mm) | 1.5 | 1.2 | 1.0 | 1.4 | 1.1 | 0.9 | 1.5 | 1.2 | 1.0 |
| Tensile strength (kg/cm$^2$) | 85 | 70 | 62 | 83 | 69 | 60 | 65 | 56 | 45 |
| Elongation (%) | 480 | 420 | 360 | 490 | 430 | 365 | 510 | 440 | 360 |
| Dimensional change by heat (%) | 0.4 | 0.6 | 0.8 | 0.5 | 0.7 | 0.9 | 0.6 | 0.8 | 1.1 |

EXAMPLES 62, 63 AND 64

The steps of Examples 56 through 58 were conducted with the amounts of EPDM and PP changed to 50 and 50 parts by weight.

EXAMPLES 65, 66 AND 67

The steps of Examples 59 through 61 were conducted with use of EPR instead of EPDM.

Controls 37, 38 and 39

The steps of Examples 53 through 55 were conducted without using Oil.

Table XV shows the results of the above Examples 62 through 67 and Controls 37 through 39.

Table XV

| | Examples | | | | | | Controls | | |
|---|---|---|---|---|---|---|---|---|---|
| | 62 | 63 | 64 | 65 | 66 | 67 | 37 | 38 | 39 |
| Ingredients | | | | | | | | | |
| Thermoplastic Elastomer | | | | | | | | | |
| EPDM | 50 | 50 | 50 | | | | 70 | 70 | 70 |
| EPR | | | | 70 | 70 | 70 | | | |
| PP | 50 | 50 | 50 | 20 | 20 | 20 | 30 | 30 | 30 |
| PIB | | | | 10 | 10 | 10 | | | |
| Oil | 30 | 30 | 30 | 30 | 30 | 30 | | | |
| Amount | 100 | 100 | 100 | 100 | 100 | 100 | 100 | 100 | 100 |
| Foaming Agent | | | | | | | | | |
| ACA-I | 0.3 | 0.5 | 0.7 | 0.3 | 0.5 | 0.7 | 0.3 | 0.5 | 0.7 |
| Evaluation | | | | | | | | | |
| Ratio of expansion | 1.10 | 1.29 | 1.50 | 1.19 | 1.42 | 1.66 | 1.03 | 1.05 | 1.10 |
| Appearance of products | 4 | 3 | 3 | 5 | 4 | 4 | 1 | 1 | 1 |

Table XV-continued

|  | Examples | | | | | | Controls | | |
| --- | --- | --- | --- | --- | --- | --- | --- | --- | --- |
|  | 62 | 63 | 64 | 65 | 66 | 67 | 37 | 38 | 39 |
| Average cell size ( ) | 450 | 350 | 300 | 360 | 220 | 130 | 350 | 250 | 200 |
| Uniformity of cells | Δ | o | o | o | ⊙ | ⊙ | x | x | x |
| Thickness of skin layer (mm) | 1.5 | 1.2 | 1.0 | 1.4 | 1.1 | 0.9 | *— | *— | *— |
| Tensile strength (kg/cm$^2$) | 86 | 73 | 63 | 69 | 57 | 49 | 64 | 62 | 59 |
| Elongation (%) | 500 | 460 | 370 | 490 | 410 | 350 | 370 | 365 | 345 |
| Dimensional change by heat (%) | 0.2 | 0.3 | 0.5 | 0.6 | 0.8 | 1.0 | 0.2 | 0.2 | 0.3 |

*measurement impossible

EXAMPLES 68, 69 AND 70

The steps of Example 56 were conducted except that, instead of 0.3 parts by weight of ACA-I, ACA-II was used as the foaming agent in amounts of 0.7, 1.0 and 1.2 parts by weight and the molding was conducted at 160° C.

EXAMPLES 71, 72 AND 73

The steps of Example 59 were conducted except that, instead of 0.3 parts by weight of ACA-I, ACA-II was used as the foaming agent in amounts of 0.7, 1.0 and 1.2 parts by weight and the molding was conducted at 160° C.

Controls 40, 41 and 42

The steps of Control 37 were conducted except that, instead of 0.3 parts by weight of ACA-I, ACA-II was used as the foaming agent in amounts of 0.7, 1.0 and 1.2 parts by weight and the molding was conducted at 160° C.

Table XVI shows the results of the above Examples 68 through 73 and Controls 40 through 42.

Table XVI

|  | Examples | | | | | | Controls | | |
| --- | --- | --- | --- | --- | --- | --- | --- | --- | --- |
|  | 68 | 69 | 70 | 71 | 72 | 73 | 40 | 41 | 42 |
| Ingredients | | | | | | | | | |
| Thermoplastic Elastomer | | | | | | | | | |
| EPDM | 70 | 70 | 70 | 70 | 70 | 70 | 70 | 70 | 70 |
| PP | 30 | 30 | 30 | 20 | 20 | 20 | 30 | 30 | 30 |
| PIB |  |  |  | 10 | 10 | 10 |  |  |  |
| Oil | 30 | 30 | 30 | 30 | 30 | 30 |  |  |  |
| Amount | 100 | 100 | 100 | 100 | 100 | 100 | 100 | 100 | 100 |
| Foaming Agent | | | | | | | | | |
| ACA-II | 0.7 | 1.0 | 1.2 | 0.7 | 1.0 | 1.2 | 0.7 | 1.0 | 1.2 |
| Evaluation | | | | | | | | | |
| Ratio of expansion | 1.32 | 1.61 | 1.93 | 1.31 | 1.65 | 1.90 | 1.05 | 1.07 | 1.10 |
| Appearance of products | 5 | 5 | 4 | 5 | 5 | 4 | 1 | 1 | 1 |
| Average cell size ( ) | 120 | 120 | 150 | 90 | 90 | 70 | 250 | 250 | 250 |
| Uniformity of cells | ⊙ | ⊙ | ⊙ | ⊙ | ⊙ | ⊙ | xx | xx | xx |
| Thickness of skin layer (mm) | 1.2 | 1.0 | 0.9 | 1.1 | 0.9 | 0.7 | *— | *— | *— |
| Tensile strength (kg/cm$^2$) | 82 | 61 | 45 | 61 | 51 | 40 | 66 | 63 | 60 |
| Elongation (%) | 460 | 350 | 210 | 470 | 410 | 200 | 380 | 370 | 345 |
| Dimensional change by heat (%) | 0.5 | 0.8 | 1.1 | 0.7 | 0.9 | 1.1 | 0.2 | 0.3 | 0.5 |

*measurement impossible.

EXAMPLES 74, 75 AND 76

100 parts by weight of the thremoplastic elastomer obtained by the same method as Example 56 were mixed with 0.7, 1.0 and 1.2 parts by weight of ACA-II in a tumbler blender. The mixtures were extrusion molded in accordance with the aforementioned method of extrusion, and the resulting products were examined.

EXAMPLES 77, 78 AND 79

The steps of Examples 74 through 76 were conducted using the thermoplastic elastomer obtained by a method similar to that of Example E7.

Controls 43, 44 and 45

The steps of Examples 74 through 76 were further conducted using the thermoplastic elastomer obtained by a method similar to that of Control 37.

Table XVII shows the results of Examples 74 through 79 and Controls 43 through 49.

Table XVII

|  | Examples | | | | | | Controls | | |
| --- | --- | --- | --- | --- | --- | --- | --- | --- | --- |
|  | 74 | 75 | 76 | 77 | 78 | 79 | 43 | 44 | 45 |
| Ingredients | | | | | | | | | |
| Thermoplastic Elastomer | | | | | | | | | |
| EPDM | 70 | 70 | 70 | 70 | 70 | 70 | 70 | 70 | 70 |
| PP | 30 | 30 | 30 | 20 | 20 | 20 | 30 | 30 | 30 |
| PIB |  |  |  | 10 | 10 | 10 |  |  |  |
| Oil | 30 | 30 | 30 | 30 | 30 | 30 |  |  |  |
| Amount | 100 | 100 | 100 | 100 | 100 | 100 | 100 | 100 | 100 |
| Foaming Agent | | | | | | | | | |
| ACA-II | 0.7 | 1.0 | 1.2 | 0.7 | 1.0 | 1.2 | 0.7 | 1.0 | 1.2 |
| Evaluation | | | | | | | | | |
| Ratio of expansion | 1.25 | 1.50 | 1.63 | 1.30 | 1.55 | 1.65 | 1.05 | 1.09 | 1.03 |
| Appearance of products | 5 | 5 | 4 | 5 | 5 | 4 | 2 | 1 | 1 |

Table XVII-continued

|  | Examples | | | | | | Controls | | |
| --- | --- | --- | --- | --- | --- | --- | --- | --- | --- |
|  | 74 | 75 | 76 | 77 | 78 | 79 | 43 | 44 | 45 |
| Average cell size ( ) | 120 | 120 | 150 | 90 | 90 | 70 | 250 | 250 | 250 |
| Uniformity of cells | O | O | o | O | O | O | x | x | x |
| Dimensional change by heat (%) | 0.9 | 2.2 | 3.7 | 0.9 | 2.4 | 3.8 | 0.2 | 0.2 | 0.2 |

The following Examples 80 through 102, Controls 46 through 58 and References 1 through 3 illustrate foamed products from blend of thermoplastic elastomer and olefin plastic.

EXAMPLE 80

(1st step)

| EPDM-I | 70 parts by weight |
| --- | --- |
| PP | 30 parts by weight |
| Oil | 30 parts by weight | were kneaded in a Bumbury mixer under nitrogen atmosphere at 180° C. for 5 minutes. The mixture was then rolled and pelletized through a sheet cutter.

(2nd step)

The pellets obtained were mixed with a solution of 0.3 parts by weight of Peroxide-A in 0.5 parts by weight of DVB in a tumbler blender so as to uniformly coat the pellets with the solution. The pellets were treated in an extruder under nitrogen atmosphere at 210° C.

(3rd step)

70 parts by weight of the pellets of the thermoplastic elastomer from the second step was mixed with 30 parts by weight of EVA pellets in a tumbler blender. The mixture was extruded from the extruder at 210° C. to give a composition comprising the thermoplastic elastomer and the olefin plastic.

(4th step)

Then, 100 parts by weight of the so-obtained composition was mixed with 0.3 parts by weight of ACA-I in a tumbler blender.

The final mixture was injection molded according to the above mentioned method, and the foamed products were

EXAMPLES 81 AND 82

The steps of Example 80 were conducted with the amount of ACA-I changed to 0.6 and 0.9 parts by weight.

Controls 46, 47 and 48

The steps of Examples 80 through 82 were conducted without using Oil in the first step.

Reference 1

There was prepared a composition comprising 100 parts by weight of an intermediate product obtained by the second step of Example 80 and 0.3 parts by weight of ACA-I. The composition was then injection molded, and the resulting foamed product was examined.

References 2 and 3

The steps of Reference 1 were conducted with the amounts of ACA-I were changed to 0.6 and 0.9 parts by weight.

Table XVIII shows the results of the above Examples 80 through 82, Controls 46 through 48 and References 1 through 3.

Table XVIII

|  | Examples | | | Controls | | | References | | |
| --- | --- | --- | --- | --- | --- | --- | --- | --- | --- |
|  | 80 | 81 | 82 | 46 | 47 | 48 | 1 | 2 | 3 |
| Ingredients |  |  |  |  |  |  |  |  |  |
| Thermoplastic Elastomer |  |  |  |  |  |  |  |  |  |
| EPDM | 70 | 70 | 70 | 70 | 70 | 70 | 70 | 70 | 70 |
| PP | 30 | 30 | 30 | 30 | 30 | 30 | 30 | 30 | 30 |
| Oil | 30 | 30 | 30 |  |  |  | 30 | 30 | 30 |
| Amount | 70 | 70 | 70 | 70 | 70 | 70 | — | — | — |
| Olefin Plastic | EVA | EVA | EVA | EVA | EVA | EVA |  |  |  |
| Amount | 30 | 30 | 30 | 30 | 30 | 30 | — | — | — |
| Foaming Agent |  |  |  |  |  |  |  |  |  |
| ACA-I | 0.3 | 0.6 | 0.9 | 0.3 | 0.6 | 0.9 | 0.3 | 0.6 | 0.9 |
| Evaluation |  |  |  |  |  |  |  |  |  |
| Ratio of expansion | 1.28 | 1.59 | 1.85 | 1.11 | 1.41 | 1.51 | 1.21 | 1.55 | 1.75 |
| Appearance of products | 5 | 4 | 4 | 3 | 2 | 2 | 3 | 2 | 2 |
| Average cell size ( ) | 250 | 180 | 150 | 450 | 430 | 420 | 380 | 240 | 220 |
| Uniformity of cells | O | O | O | x | x | x | x | x | x |
| Thickness of skin layer (mm) | 1.25 | 0.90 | 0.75 | * | * | * | 1.4 | 1.0 | 0.8 |
| Tensile strength (kg/cm$^2$) | 85 | 72 | 63 | 79 | 68 | 54 | 83 | 69 | 60 |
| Elongation (%) | 470 | 410 | 330 | 420 | 390 | 340 | 490 | 430 | 365 |
| Dimensional change by heat (%) | 0.7 | 0.9 | 1.3 | 0.9 | 1.5 | 1.7 | 0.5 | 0.7 | 0.9 |

*measurement impossible

Controls 49, 50 and 51

The steps of References 1 through 3 were conducted without using Oil in the first step.

EXAMPLE 83

The steps of Example 81 were conducted except the PP was used instead of EVA in the third step, and the molding was conducted at 220° C.

EXAMPLE 84

The steps of Example 81 were conducted except that LDPE was used instead of EVA in the third step.

EXAMPLE 85

The steps of Example 81 were conducted except that the 30 parts by weight of EVA in the third step were placed by a mixture of 15 parts by weight of HDPE and 15 parts by weight of MDPE.

Table XIX shows the results of the above Examples 83 through 85 and Controls 49 through 51.

EXAMPLE 90

The steps of Example 89 were conducted except that PP was used instead of EVA, and the molding was conducted at 220° C.

EXAMPLE 91

The steps of Example 81 were conducted using a mixture of 90 parts by weight of EPDM, 10 parts by weight of PIB and 30 parts by weight of Oil in the first step.

Table XIX

|  | Controls | | | Examples | | |
| --- | --- | --- | --- | --- | --- | --- |
|  | 49 | 50 | 51 | 83 | 84 | 85 |
| Ingredients | | | | | | |
| Thermoplastic Elastomer | | | | | | |
| EPDM | 70 | 70 | 70 | 70 | 70 | 70 |
| PP | 30 | 30 | 30 | 30 | 30 | 30 |
| Oil | | | | 30 | 30 | 30 |
| Amount | — | — | — | 70 | 70 | 70 |
| Olefin Plastic | — | — | — | PP | LDPE | HDPE/MDPE |
| Amount | | | | 30 | 30 | 15/15 |
| Foaming Agent | | | | | | |
| ACA-I | 0.3 | 0.6 | 0.9 | 0.6 | 0.6 | 0.6 |
| Evaluation | | | | | | |
| Ratio of expansion | 1.03 | 1.08 | 1.15 | 1.35 | 1.58 | 1.56 |
| Appearance of products | 1 | 1 | 1 | 4 | 4 | 4 |
| Average cell size ( ) | 550 | 530 | 520 | 300 | 200 | 230 |
| Uniformity of cells | xx | xx | xx | o | O | O |
| Thickness of skin layer (mm) | * | * | * | 0.85 | 0.95 | 0.90 |
| Tensile strength (kg/cm$^2$) | 64 | 61 | 55 | 95 | 75 | 77 |
| Elongation (%) | 550 | 530 | 480 | 290 | 400 | 390 |
| Dimensional change by heat (%) | 0.2 | 0.3 | 0.4 | 0.4 | 0.9 | 0.8 |

*measurement impossible

EXAMPLES 86, 87 AND 88

The steps of Examples 80 through 82 were conducted with the amount of PP decreased from 30 to 20 parts by weight and with addition of 10 parts by weight of PIB.

EXAMPLE 89

The steps of Example 81 were conducted using a mixture of 100 parts by weight of EPDM and 30 parts by weight of Oil in the first step.

EXAMPLE 92

The steps of Example 91 were conducted using MDPE instead of EVA in the third step.

Control 52

The steps of Example 89 were conducted without using Oil in the first step.

Table XX shows the results of the above Examples 86 through 92 and Control 52.

Table XX

|  | Examples | | | | | | | Control |
| --- | --- | --- | --- | --- | --- | --- | --- | --- |
|  | 86 | 87 | 88 | 89 | 90 | 91 | 92 | 52 |
| Ingredients | | | | | | | | |
| Thermoplastic Elastomer | | | | | | | | |
| EPDM | 70 | 70 | 70 | 100 | 100 | 90 | 90 | 100 |
| PP | 20 | 20 | 20 | | | | | |
| PIB | 10 | 10 | 10 | | | 10 | 10 | |
| Oil | 30 | 30 | 30 | 30 | 30 | 30 | 30 | |
| Amount | 70 | 70 | 70 | 70 | 70 | 70 | 70 | 70 |
| Olefin Plastic | EVA | EVA | EVA | EVA | PP | EVA | MDPE | EVA |
| Amount | 30 | 30 | 30 | 30 | 30 | 30 | 30 | 30 |
| Foaming Agent | | | | | | | | |
| ACA-I | 0.3 | 0.6 | 0.9 | 0.6 | 0.6 | 0.6 | 0.6 | 0.6 |
| Evaluation | | | | | | | | |
| Ratio of expansion | 1.28 | 1.59 | 1.87 | 1.56 | 1.33 | 1.58 | 1.48 | 1.25 |
| Appearance of products | 5 | 4 | 4 | 4 | 3 | 4 | 4 | 1 |
| Average cell size ( ) | 240 | 160 | 140 | 140 | 290 | 150 | 220 | 550 |
| Uniformity of cells | O | O | O | o | o | o | o | x |
| Thickness of skin layer (mm) | 1.25 | 0.91 | 0.78 | 1.0 | 0.89 | 1.0 | 0.9 | * |
| Tensile strength (kg/cm$^2$) | 83 | 70 | 61 | 68 | 99 | 63 | 72 | 80 |
| Elongation (%) | 460 | 420 | 350 | 400 | 260 | 410 | 420 | 490 |
| Dimensional change by heat (%) | 0.7 | 0.9 | 1.4 | 0.7 | 0.5 | 0.7 | 0.6 | 0.3 |

*measurement impossible

EXAMPLE 93

The steps of Example 81 were conducted with a different blend ratio of the elastomer composition and the EVA.

EXAMPLE 94

The steps of Example 87 were conducted with a different blend ratio of the elastomer composition and the EVA.

EXAMPLE 95

The steps of Example 89 were conducted with a different blend ratio of the elastomer composition and the EVA.

Control 53

Injection molding was carried out using a foamable composition comprising 100 parts by weight of EVA and 0.6 parts by weight of ACA-I, and the resulting foamed product was examined.

EXAMPLE 96

The steps of Example 93 were conducted using EPC instead of EVA.

Control 54

The steps of Control 53 were conducted using EPC instead of EVA.

EXAMPLE 97

The steps of Example 93 were conducted except that PP was used instead of EVA and the molding was conducted at 220° C.

Control 55

The steps of Control 53 were conducted except that PP was used instead of EVA and the molding was conducted at 220° C.

Table XXI shows the results of the above Examples 93 through 97 and Controls 53 through 55.

Table XXI

|  | Examples | | | Control | Example | Control | Example | Control |
|---|---|---|---|---|---|---|---|---|
|  | 93 | 94 | 95 | 53 | 96 | 54 | 97 | 55 |
| Ingredients | | | | | | | | |
| Thermoplastic Elastomer | | | | | | | | |
| EPDM | 70 | 70 | 100 | | 70 | | 70 | |
| PP | 30 | 20 | | | 30 | | 30 | |
| PIB | | 10 | | | | | | |
| Oil | 30 | 30 | 30 | | 30 | | 30 | |
| Amount | 40 | 40 | 40 | — | 40 | — | 40 | — |
| Olefin Plastic | EVA | EVA | EVA | EVA | EPC | EPC | PP | PP |
| Amount | 60 | 60 | 60 | 100 | 60 | 100 | 60 | 100 |
| Foaming Agent | | | | | | | | |
| ACA-I | 0.6 | 0.6 | 0.6 | 0.6 | 0.6 | 0.6 | 0.6 | 0.6 |
| Evaluation | | | | | | | | |
| Ratio of expansion | 1.35 | 1.38 | 1.33 | 1.20 | 1.27 | 1.15 | 1.21 | 1.12 |
| Appearance of products | 4 | 4 | 4 | 2 | 4 | 1 | 3 | 1 |
| Average cell size ( ) | 300 | 290 | 310 | 330 | 310 | 390 | 380 | 490 |
| Uniformity of cells | ⊙ | ⊙ | ⊙ | Δ | ⊙ | x | o | xx |
| Thickness of skin layer (mm) | 0.75 | 0.78 | 0.73 | * | 0.65 | * | 0.50 | * |
| Tensile strength (kg/cm$^2$) | 72 | 70 | 45 | 69 | 76 | 98 | 104 | 180 |
| Elongation (%) | 170 | 180 | 160 | 150 | 160 | 140 | 60 | 30 |
| Dimensional change by heat (%) | 4.9 | 5.1 | 5.5 | melt | 0.9 | 0.5 | 0.4 | 0.2 |

*measurement impossible

EXAMPLE 98

Extrusion molding was carried out using the foamable composition obtained by the Steps of Example 82, and the resulting foamed product was examined.

EXAMPLES 99 and 100

The steps of Example 98 were conducted except that the amount of foaming agent was changed to 1.2 and 1.4 parts by weight.

EXAMPLE 101

The steps of Example 98 were conducted using the foamable composition obtained by the steps of Example 85.

EXAMPLE 102

The steps of Example 98 were conducted using the foamable composition obtained by the steps of Example 88.

Control 56

The steps of Example 98 were conducted using the foamable composition obtained by the steps of Control 48.

Controls 57 and 58

The steps of Control 56 were conducted except that the amount of foaming agent was changed to 1.2 and 1.4 parts by weight.

Table XXII shows the results of the above Examples 98 through 102 and Controls 56 through 58.

Table XXII

|  | Examples | | | | | Controls | | |
|---|---|---|---|---|---|---|---|---|
|  | 98 | 99 | 100 | 101 | 102 | 56 | 57 | 58 |
| Ingredients | | | | | | | | |
| Thermoplastic Elastomer | | | | | | | | |

Table XXII-continued

| | Examples | | | | | Controls | | |
|---|---|---|---|---|---|---|---|---|
| | 98 | 99 | 100 | 101 | 102 | 56 | 57 | 58 |
| EPDM | 70 | 70 | 70 | 90 | 70 | 70 | 70 | 70 |
| PP | 30 | 30 | 30 | | 20 | 30 | 30 | 30 |
| PIB | | | | 10 | 10 | | | |
| Oil | 30 | 30 | 30 | 30 | 30 | | | |
| Amount | 70 | 70 | 70 | 70 | 70 | 70 | 70 | 70 |
| Olefin Plastic | EVA | EVA | EVA | EVA | EVA | EVA | EVA | EVA |
| Amount | 30 | 30 | 30 | 30 | 30 | 30 | 30 | 30 |
| Foaming Agent | | | | | | | | |
| ACA-I | 0.9 | 1.2 | 1.4 | 0.9 | 0.9 | 0.9 | 1.2 | 1.4 |
| Evaluation | | | | | | | | |
| Ratio of expansion | 1.28 | 1.68 | 1.80 | 1.27 | 1.29 | 1.12 | 1.35 | 1.48 |
| Appearance of products | 5 | 4 | 4 | 5 | 5 | 2 | 1 | 1 |
| Average cell size ( ) | 280 | 270 | 250 | 220 | 290 | 410 | 390 | 370 |
| Uniformity of cells | O | O | O | O | O | x | x | x |
| Thickness of skin layer (mm) | 0.4 | 0.3 | 0.3 | 0.4 | 0.4 | * | * | * |
| Dimensional change by heat (%) | 1.0 | 3.9 | 4.2 | 0.9 | 1.1 | 0.4 | 2.1 | 3.5 |

*measurement impossible

We claim:

1. A thermoplastic composition which comprises:
   100 to 5 parts by weight of (A) a partially cured elastomer composition obtained by dynamic heat-treatment, in the presence of an organic peroxide, of a mixture of 100 to 40 parts by weight of (a) peroxide-curable olefin copolymer rubber selected from the group consisting of ethylene-propylene copolymer rubber and ethylene-propylene-non conjugated diene terpolymer rubber,
   0 to 60 parts by weight of (b) a peroxide-decomposing olefin plastic selected from the group consisting of isotactic polypropylene and propylene- alpha olefin copolymer.
   wherein the sum of the component (a) and the component (b) is 100 parts by weight, and
   5 to 100 parts by weight of (c) at least one member of peroxide-non curable hydrocarbon rubbery material selected from the group consisting of polyisobutylene and butyl rubber, and (d) mineral oil softener; and
   0 to 95 parts by weight of (B) an olefin plastic selected from the group consisting of hompolymers of an alpha olefin selected from the group consisting of ethylene, propylene, 1-butene, 1-pentene, 3-methyl-1-butene, 1-hexene, 3-methyl-1-pentene, 4-methyl-1-pentene and 1-octene; copolymers therebetween; and copolymers thereof with 15 mole % or less of another copolymerizable monomer;
   wherein the sum of the component (b) and the component B account for not less than 5 parts by weight among 100 parts by weight of the final composition.

2. A thermoplastic composition according to claim 1, which comprises a partially cured elastomer composition obtained by dynamic heat-treatment in the presence of an organic peroxide of a mixture of
   90 to 40 parts by weight of said (a) peroxide-curable olefin copolymer rubber,
   10 to 60 parts by weight of said (b) peroxide-decomposing olefin plastic,
   wherein the sum of said component (a) and said component (b) is 100 parts by weight, and
   5 to 100 parts by weight of at least one member of said (c) peroxide-non-curable hydrocarbon rubbery material and said (d) mineral oil softener.

3. A thermoplastic composition according to claim 1, which comprises 100 parts by weight of (A) a partially cured elastomer composition obtained by dynamic heat-treatment in the presence of an organic peroxide of a mixture of
   100 to 5 parts by weight of said (a) peroxide-curable olefin copolymer rubber,
   0 to 50 parts by weight of said (b) peroxide-decomposing olefin plastic,
   wherein the sum of said component (a) and said component (b) is 100 parts by weight, and
   5 to 100 parts by weight of at least one member of said (c) peroxide-non-curable hydrocarbon rubbery material and said (d) mineral oil softener; and
   0 to 95 parts by weight of said (B) olefin plastic, wherein the sum of said component (b) and said component (B) account for not less than 5 parts by weight among 100 parts by weight of the final composition.

4. A thermoplastic composition according to claim 1, which comprises:
   5 to 95 parts by weight (A) a partially cured elastomer composition obtained by dynamic heat-treatment in the presence of an organic peroxide of a mixture of 90 to 50 parts by weight of said (a) peroxide curable olefin copolymer rubber,
   10 to 50 parts by weight of said (b) peroxide-decomposing olefin plastic,
   wherein the sum of said component (a) and said component (b) is 100 parts by weight, and 5 to 50 parts by weight of at least one member of said (c) peroxide non curable hydrocarbon rubbery material and said (d) mineral oil softener; and
   95 to 5 parts by weight of said (B) olefin plastic.

5. A composition according to claim 1, 2, 3 or 4, wherein said ethylene-propylene non-conjugated diene copolymer rubber is ethylene-propylene-ethylidene norbornene copolymer rubber.

6. A composition according to claim 1, 2, 3 or 4, wherein the mooney viscosity ML 1+4 (100 c) of the said (a) peroxide curable olefin copolymer rubber is in the range of 40 to 80.

7. A composition according to claim 1, 2, 3 or 4, wherein the (b) peroxide-decomposing olefin plastic is propylene-alpha-olefin copolymer.

8. A composition according to claim 1, 2, 3 or 4, wherein said (c) peroxide-non-curable hydrocarbon rubbery material is mixed in an amount of 5 to 20 parts by weight with 100 parts by weight in total of said component (a) and said component (b).

9. A composition according to claim 1, 2, 3 or 4, wherein said (d) mineral oil softener is mixed in an amount of 10 to 40 parts by weight with 100 parts by weight in total of said component (a) and said component (b).

10. A composition according to claim 1, 2, 3 or 4, wherein the Melt Index (ASTM D-1238-65T) of said (B) olefin plastic is from 10 to 50 measured at 230° C. when said olefin plastic is a propylene homopolymer or a copolymer wherein the predominant monomer is propylene; and 190° C. for other of said olefin plastics.

11. A method of producing a thermoplastic composition, which comprises dynamically heat-treating, in the presence of an organic peroxide, a mixture of 100 to 40 parts by weight of (a) a peroxide-curable olefin copolymer rubber selected from the group consisting of ethylene-propylene copolymer rubber and ethylene-propylene-non conjugated diene terpolymer rubber, 0 to 60 parts by weight of (b) a peroxide-decomposing olefin plastic selected from the group consisting of isotactic polypropylene and propylene-alpha olefin copolymer, wherein the sum of component (a) and component (b) is 100 parts by weight, 5 to 100 parts by weight of at least one member of (c) peroxide-non-curable hydrocarbon rubbery material selected from polyisobutylene and butyl rubber, and (d) mineral oil softeners; to obtain a thermoplastic elastomer composition (A); and then, homogeneously blending 100 to 5 parts by weight of said composition (A) and 0 to 95 parts by weight of (B) an olefin plastic selected from the group consisting of homopolymers of an alpha olefin selected from the group consisting of ethylene, propylene, 1-butene, 1-pentene, 3-methyl-1-butene, 1-hexene, 3-methyl-1-pentene, 4-methyl-1-pentene and 1-octene; copolymers therebetween; and copolymers thereof with 15 mole % or less of another copolymerizable monomer;

wherein the sum of said component (b) and said component (B) account for not less than 5 parts by weight among 100 parts of the final product.

12. A method according to claim 11, wherein said organic peroxide is 1,3-bis(tert.-butyl peroxyisopropyl) benzene 13. A method according to claim 11, wherein said organic peroxide is used in an amount of 0.05 to 1.0% by weight based on the mixture to be heat-treated.

14. A method according to claim 11, wherein said mixture is heat-treated in the presence of an organic peroxide and divinyl benzene.

15. A method according to claim 14, wherein divinyl benzene is used in amount of 0.1 to 2% by weight based on the mixture to be heat-treated.

16. A method according to claim 14, wherein said organic peroxide is added to said mixture as a dispersion in divinyl benzene.

17. A method of producing a thermoplastic elastomer composition, which comprises dynamically heat-treating, in the presence of an organic peroxide and divinyl benzene, a mixture of 90 to 40 parts by weight of (a) a peroxide-curable olefin copolymer rubber selected from the group consisting of ethylene-propylene copolymer rubber and ethylene-propylene-non conjugated diene copolymer rubber and 10 to 60 parts by weight of (b) a peroxide-decomposing olefin plastic selected from the group consisting of isotactic polypropylene and propylene-alpha olefin copolymer, wherein the sum of these components is 100 parts by weight.

18. A method according to claim 17, wherein divinyl benzene is used in an amount of 0.1 to 2.0% by weight of the mixture to be heat-treated.

19. A method according to claim 14, wherein said organic peroxide is added to said mixture as a dispersion in divinyl benzene.

20. A method according to claim 11 or 17, wherein the temperature of said heat-treatment is 150° to 280° C.

* * * * *